United States Patent
Takahashi et al.

(10) Patent No.: US 9,529,562 B2
(45) Date of Patent: Dec. 27, 2016

(54) IMAGE DISPLAY APPARATUS, IMAGE OUTPUT APPARATUS, AND CONTROL METHODS THEREFOR

(71) Applicant: CANON KABUSHIKI KAISHA, Tokyo (JP)

(72) Inventors: Miyako Takahashi, Kawasaki (JP); Atsushi Morita, Yokohama (JP); Takeshi Ikeda, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 191 days.

(21) Appl. No.: 14/186,548

(22) Filed: Feb. 21, 2014

(65) Prior Publication Data
US 2014/0240201 A1    Aug. 28, 2014

(30) Foreign Application Priority Data

Feb. 28, 2013  (JP) .................................. 2013-039271
Jan. 9, 2014   (JP) .................................. 2014-002770

(51) Int. Cl.
*G06F 3/147*     (2006.01)
*G09G 5/10*      (2006.01)
(Continued)

(52) U.S. Cl.
CPC ........... *G06F 3/1446* (2013.01); *G09G 3/3426* (2013.01); *G09G 5/10* (2013.01);
(Continued)

(58) Field of Classification Search
CPC .................. G09G 2300/0261; G09G 2356/00;
G09G 2360/04; G09G 3/3426; G09G 5/10; G09G 2320/0233; G09G 2360/145; G09G 2360/16; G09G 2300/026; G06F 3/1446
(Continued)

(56) References Cited

U.S. PATENT DOCUMENTS 5,668,569 A * 9/1997 Greene ..................... G09G 3/20
                                                      345/103
6,005,649 A * 12/1999 Krusius ............... G02F 1/13336
                                                       349/20
(Continued)

FOREIGN PATENT DOCUMENTS

JP   2012058475 A   3/2012
JP   2012226176 A   11/2012
(Continued)

*Primary Examiner* — Julie Anne Watko
(74) *Attorney, Agent, or Firm* — Fitzpatrick, Cella, Harper & Scinto

(57) ABSTRACT

There is provided an image display apparatus that configures, together with another image display apparatus, a multi-screen display system. The image display apparatus includes a light emitting unit, an acquiring unit configured to acquire information concerning light emission brightness of the light emitting unit of the image display apparatus and the other image display apparatus, and a correcting unit configured to correct, on the basis of the information acquired by the acquiring unit, at least one of the light emission brightness of the light emitting unit of the image display apparatus and the other image display apparatus to thereby determine the light emission brightnesses of the light emitting units of the image display apparatus and the other image display apparatus.

12 Claims, 26 Drawing Sheets

(51) Int. Cl.
*G06F 3/14* (2006.01)
*G09G 3/34* (2006.01)
*G09G 3/36* (2006.01)

(52) U.S. Cl.
CPC . *G09G 2320/0233* (2013.01); *G09G 2356/00* (2013.01); *G09G 2360/145* (2013.01); *G09G 2360/16* (2013.01)

(58) Field of Classification Search
USPC .................................................. 345/1.1–3.1
See application file for complete search history.

(56) References Cited

U.S. PATENT DOCUMENTS

| | | | | |
|---|---|---|---|---|
| 6,014,193 | A * | 1/2000 | Taira | G02F 1/13336 345/90 |
| 6,184,953 | B1 * | 2/2001 | Greene | G06F 3/147 345/88 |
| 6,414,661 | B1 * | 7/2002 | Shen | G09G 3/3208 345/46 |
| 7,009,627 | B2 | 3/2006 | Abe et al. | |
| 7,227,521 | B2 | 6/2007 | Yamazaki et al. | |
| 7,239,367 | B2 * | 7/2007 | Jin | G02F 1/13336 345/1.3 |
| 7,889,168 | B2 | 2/2011 | Yamazaki et al. | |
| 8,872,733 | B2 * | 10/2014 | Yoshimura | G09G 3/3426 345/1.3 |
| 8,902,128 | B2 * | 12/2014 | Wood | H04N 9/3147 345/1.1 |
| 9,341,880 | B2 * | 5/2016 | Wang | G09G 3/3607 |
| 2002/0163597 | A1 * | 11/2002 | Kelleher | G06F 3/1446 348/707 |
| 2005/0078104 | A1 * | 4/2005 | Matthies | G02F 1/13336 345/204 |
| 2005/0285811 | A1 * | 12/2005 | Kawase | G02F 1/13336 345/1.1 |
| 2006/0028687 | A1 * | 2/2006 | Karaki | G09G 3/2088 358/3.01 |
| 2009/0096804 | A1 * | 4/2009 | Gerets | G06F 3/1446 345/589 |
| 2010/0053450 | A1 * | 3/2010 | Hanamura | G06F 3/1446 348/687 |
| 2010/0117927 | A1 * | 5/2010 | Amagami | G06F 1/1616 345/1.1 |
| 2010/0328336 | A1 * | 12/2010 | Si | G09G 3/3666 345/589 |
| 2012/0056902 | A1 | 3/2012 | Yoshino | |
| 2012/0268350 | A1 * | 10/2012 | Yoshimura | G09G 3/3426 345/1.3 |
| 2012/0268505 | A1 * | 10/2012 | Tani | G09G 3/342 345/694 |
| 2014/0043380 | A1 * | 2/2014 | Ichioka | H04N 5/57 345/690 |
| 2015/0130684 | A1 * | 5/2015 | Tsuchida | G06F 3/1446 345/1.3 |
| 2015/0153995 | A1 * | 6/2015 | Curtis | G06F 3/1446 345/1.3 |

FOREIGN PATENT DOCUMENTS

| | | |
|---|---|---|
| JP | 2012226177 A | 11/2012 |
| JP | 2012226178 A | 11/2012 |
| JP | 2012226179 A | 11/2012 |

* cited by examiner

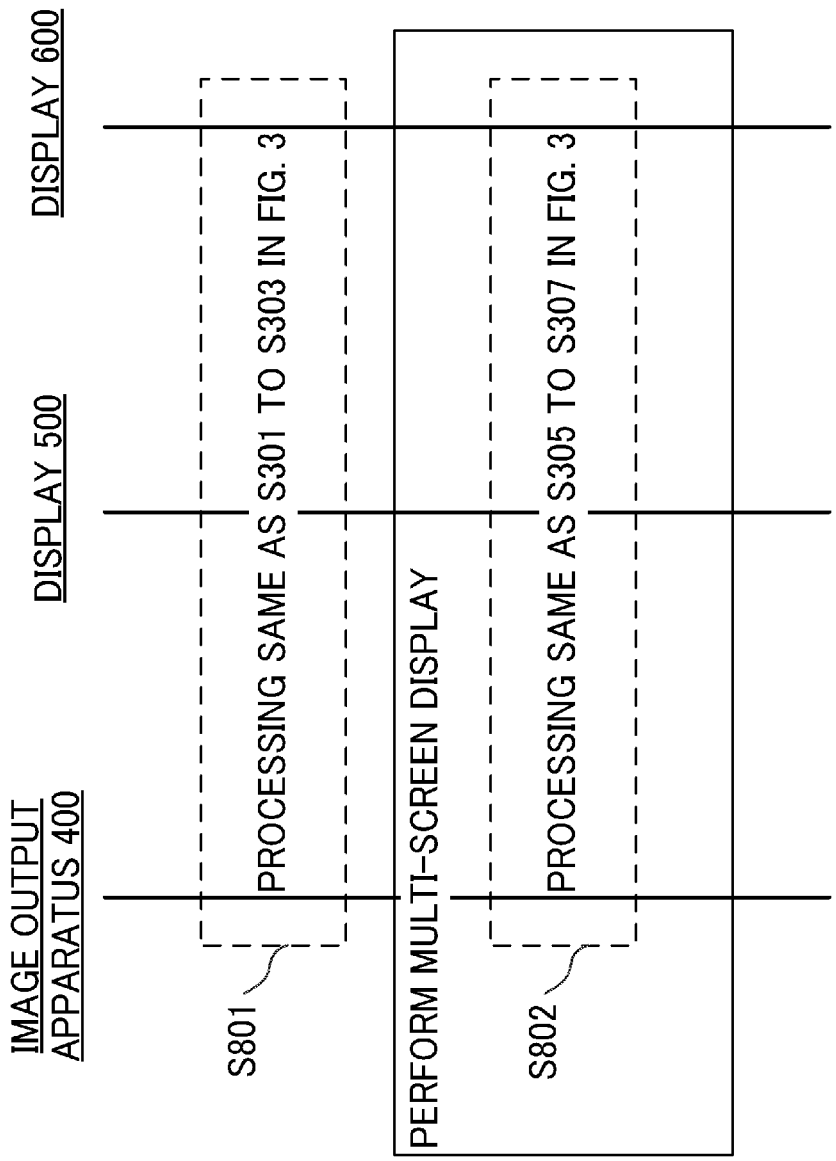

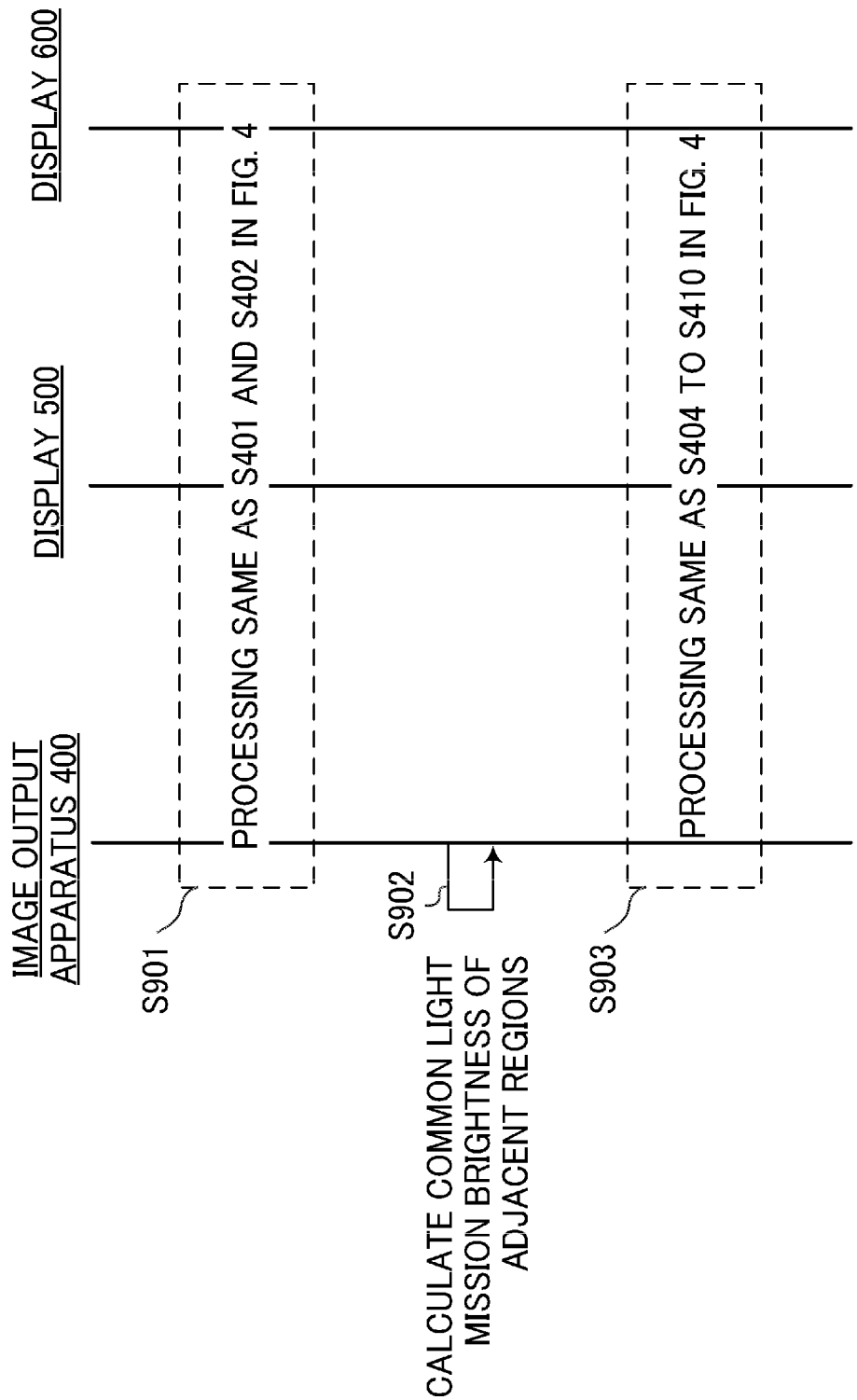

IMAGE DISPLAY APPARATUS, IMAGE OUTPUT APPARATUS, AND CONTROL METHODS THEREFOR

BACKGROUND OF THE INVENTION

Field of the Invention

The present invention relates to an image display apparatus, an image output apparatus, and control methods therefor.

Description of the Related Art

A multi-screen display system (a multi-image display apparatus) is widely adopted in which a plurality of image display apparatuses (hereinafter referred to as displays) are arranged longitudinally and laterally (in a matrix shape) adjacent to one another and connected to one another to configure one image display apparatus as a whole (see, for example, Japanese Patent Application Laid-Open No. 2012-58475). In the following explanation, display of an image in the multi-screen display system is referred to as multi-screen display. As the image display apparatus used in the multi-screen display system, a liquid crystal display is often adopted from the viewpoint of a reduction in weight and thickness, installability, and the like.

In Video Electronics Standard Association (VESA), which is an industry standardization organization concerning moving image related apparatuses, a standard concerning the multi-screen display system is proposed. In the proposal, a connection configuration and arrangement information of a display is described in a Display ID transmitted by a sync apparatus (a display) to enable a source apparatus side (an image output apparatus such as a PC) to grasp the configuration of the multi-screen display system.

In the liquid crystal display, there is a technique for controlling, for each of a plurality of control regions configuring a screen, according to input image data, light emission brightness of a light source of a backlight configured by a light emitting diode (LED) or the like. Further, there is a technique for controlling, for each of control regions, light emission brightness of a light source of a backlight according to input image data and correcting the image data according to a level of the light emission brightness. These techniques are called local dimming. By using the local dimming techniques, it is possible to improve contrast of image display and suppress floating black.

SUMMARY OF THE INVENTION

However, in the multi-screen display system, a problem sometimes occurs when local dimming control is used. A problem caused by the local dimming control is explained with reference to FIGS. 24A to 24D.

A display 1 and a display 2 having a local dimming processing function are arranged side by side to configure a multi-screen display system. Backlight units of the displays 1 and 2 are divided into a plurality of regions as indicated by region division lines 3. Light emission brightness can be controlled for each of the divided regions (the divided regions for which light the emission brightness can be controlled are hereinafter referred to as backlight control regions).

FIG. 24A shows a state in which an object 4 is displayed across the displays 1 and 2. The object 4 is configured by pixels having a high pixel value (brightness). A background image excluding the object 4 is configured by pixels having a low pixel value (brightness).

FIG. 24B shows a light emission brightness in each of backlight control regions obtained when an image shown in FIG. 24A is displayed and the local dimming control is carried out. Light emission brightness of the backlight control regions where the object 4 having the high pixel value (brightness) is displayed has a high value. Light emission brightness of the backlight control regions where the background image having the low pixel value (brightness) is displayed has a low value.

FIG. 24C shows light sources 6 and irradiated light 7 of the backlight units in an A-B cross section of FIG. 24B. FIG. 24D shows an irradiated light distribution 10 (a brightness distribution) in the entire backlights obtained when the light sources in the backlight control regions in the A-B cross section are lit at the light emission brightness shown in FIG. 24B.

The irradiated light distribution 10 of the backlights is a distribution having a peak in the center portion of the backlight control regions because of an interference of the irradiated light 7 from the light sources 6. Therefore, in some cases, a gradient occurs in light emission brightness of light made incident on a liquid crystal panel and display brightness on the liquid crystal panel (brightness determined by a combination of a pixel value and light emission brightness) does not reach target brightness. Therefore, an input image is corrected to perform image display at appropriate display brightness. Specifically, a target value (target brightness) of optimum display brightness is set for each of the pixels on the basis of a pixel value of the input image. The pixel value of the input image is corrected such that the display brightness reaches the target brightness. For example, a pixel having the display brightness higher than the target brightness because of an interference of irradiated light is corrected to reduce the pixel value and the transmittance of the liquid crystal panel is reduced to adjust the display brightness to reach the target brightness.

However, depending on a combination of a pixel value and light emission brightness, the correction of the pixel value for setting the display brightness to coincide with the target brightness cannot be performed.

For example, an input image on an A-B line in a backlight control region 5 shown in FIG. 24B is a background image having a low pixel value (brightness). Light emission brightness of the backlight control region 5 is a high value (128). If the pixel value (brightness) is a value close to zero (black), a reduction correction amount of the pixel value necessary for setting the display brightness to the target brightness is sometimes larger than the original pixel value. In that case, the display brightness cannot be reduced to the target brightness. As a result floating black occurs in a displayed image.

Further, in the multi-screen display system, there is a problem in that discontinuity of brightness near a boundary between the displays is conspicuous.

As shown in FIGS. 24C and 24D, even if the light emission brightness is different in each of the backlight control regions, in the same housing, light emission brightness around a boundary 8 (a region boundary) between the backlight control regions has continuity because of the interference of the irradiated light 7 from the backlight control regions adjacent to each other.

However, the irradiated light 7 from the light sources 6 of the display 1 is blocked by a housing 9 of the display 1. Therefore, the irradiated light 7 from the light sources 6 of the display 1 cannot interfere with irradiated light from light sources of the display 2. A level difference occurs in the irradiated light distribution 10 between the displays. As a result, discontinuity of the display brightness is conspicuous between the displays and gives a sense of discomfort to a user.

It is an object of the present invention to suppress, in a multi-screen display system including a plurality of displays, display brightness from being discontinuous in a boundary portion between the displays and perform multi-screen display at high image quality.

According to a first aspect of the present invention, there is provided an image display apparatus that configures, together with another image display apparatus, a multi-screen display system in which one screen is configured by a plurality of image display apparatuses, the image display apparatus including:

a light emitting unit of which light emission brightness can be controlled;

an acquiring unit configured to acquire information concerning light emission brightness of the light emitting unit of the image display apparatus calculated on the basis of an image displayed by the image display apparatus, and information concerning light emission brightness of a light emitting unit of the other image display apparatus; and a correcting unit configured to correct, on the basis of the information concerning the light emission brightnesses of the light emitting units of the image display apparatus and the other image display apparatus acquired by the acquiring unit, at least one of the light emission brightness of the light emitting unit of the image display apparatus and the light emission brightness of the light emitting unit of the other image display apparatus to thereby determine the light emission brightnesses of the light emitting units of the image display apparatus and the other image display apparatus.

According to a second aspect of the present invention, there is provided an image output apparatus that outputs an image to a multi-screen display system in which one screen is configured by a plurality of image display apparatuses each including a light emitting unit of which light emission brightness can be controlled, the image output apparatus including:

an acquiring unit configured to acquire information concerning light emission brightnesses of the light emitting units of the image display apparatuses, each of the light emission brightnesses being calculated on the basis of image displayed by each of the image display apparatuses;

a correcting unit configured to correct, on the basis of the information concerning the light emission brightnesses of the light emitting units of the image display apparatuses acquired by the acquiring unit, the light emission brightness of the light emitting unit of at least one of the plurality of image display apparatuses to thereby determine the light emission brightnesses of the light emitting units of the image display apparatuses; and a transmitting unit configured to transmit information concerning the light emission brightnesses of the light emitting units of the image display apparatuses determined by the correcting unit to the image display apparatuses.

According to a third aspect of the present invention, there is provided a control method for an image display apparatus including a light emitting unit of which light emission brightness can be controlled, the image display apparatus configuring, together with another image display apparatus, a multi-screen display system in which one screen is configured by a plurality of image display apparatuses, the control method including:

acquiring information concerning light emission brightness of the light emitting unit of the image display apparatus calculated on the basis of an image displayed by the image display apparatus, and information concerning light emission brightness of a light emitting unit of the other image display apparatus; and correcting, on the basis of the acquired information concerning the light emission brightnesses of the light emitting units of the image display apparatus and the other image display apparatus, at least one of the light emission brightness of the light emitting unit of the image display apparatus and the light emission brightness of the light emitting unit of the other image display apparatus to thereby determine the light emission brightnesses of the light emitting units of the image display apparatus and the other image display apparatus.

According to a fourth aspect of the present invention, there is provided a control method for an image output apparatus that outputs an image to a multi-screen display system in which one screen is configured by a plurality of image display apparatuses each including a light emitting unit of which light emission brightness can be controlled, the control method including:

acquiring information concerning light emission brightnesses of the light emitting units of the image display apparatuses, each of the light emission brightnesses being calculated on the basis of image displayed by each of the image display apparatuses;

correcting, on the basis of the acquired information concerning the light emission brightnesses of the light emitting units of the image display apparatuses, the light emission brightness of the light emitting unit of at least one of the plurality of image display apparatuses to thereby determine the light emission brightnesses of the light emitting units of the image display apparatuses; and transmitting information concerning the determined light emission brightnesses of the light emitting units of the image display apparatuses to the image display apparatuses.

According to the present invention, it is possible to suppress, in a multi-screen display system including a plurality of displays, display brightness from being discontinuous in a boundary portion between the displays and perform multi-screen display at high image quality.

Further features of the present invention will become apparent from the following description of exemplary embodiments with reference to the attached drawings.

BRIEF DESCRIPTION OF THE DRAWINGS

FIG. 8 is a flowchart for explaining initial setting necessary for building a multi-screen display system in the second embodiment;

FIG. 9 is a flowchart for explaining processing for setting light emission brightnesses near a display boundary to coincide with each other in the second embodiment;

DESCRIPTION OF THE EMBODIMENTS

First Embodiment

A display apparatus and a control method for the display apparatus according to a first embodiment of the present invention are explained below.

Figure 1:
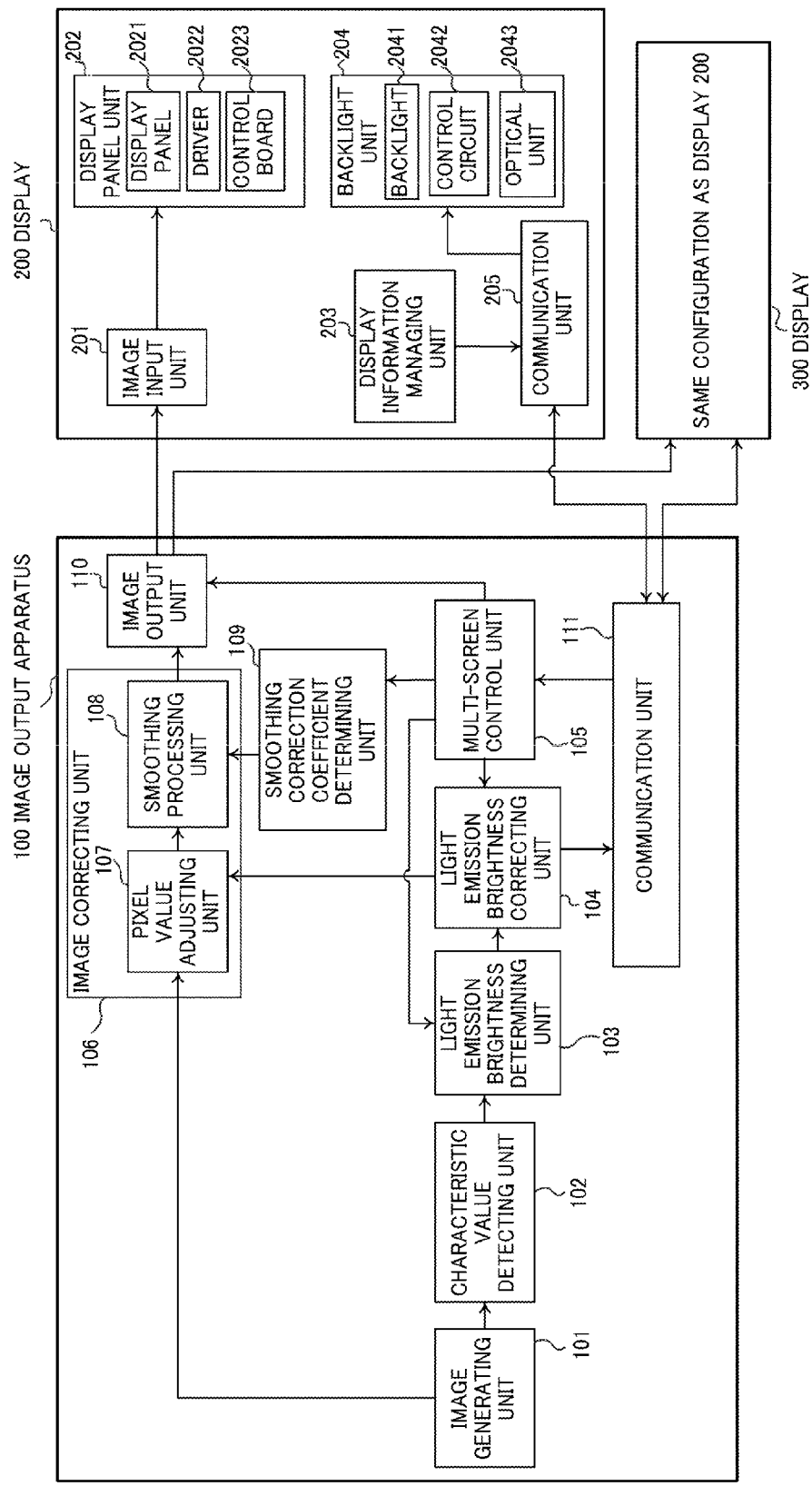
FIG. 1 is a block diagram showing the schematic configuration of a display in a first embodiment.

In the first embodiment, as shown in FIG. 1, a multi-screen display system (a multi-display system) is built using an image output apparatus 100, a display 200 (an image display apparatus), and a display 300. It is assumed that screen sizes, resolutions, the numbers of divisions of backlight control regions (divided regions), and division sizes of the backlight control regions of displays coincide with each other between the displays. The backlight control regions are control units in which light emissions of backlights can be controlled independently from one another. The number of displays configuring the multi-screen display system is not limited to two and may be three or more. In an example explained in the first embodiment, the display apparatus is a liquid crystal display apparatus including a backlight and a liquid crystal panel. However, the display apparatus is not limited to the liquid crystal display apparatus. For example, instead of the liquid crystal panel, a display panel including a display element other than a liquid crystal element as a display element for transmitting light from the backlight may be used. The display apparatus may be a micro electro mechanical system (MEMS) shutter type display including a MEMS shutter instead of the liquid crystal element.

FIG. 1 is a block diagram showing the schematic configuration of the image output apparatus 100 and the display 200 according to the first embodiment. The display 300 has a configuration same as the configuration of the display 200. The image output apparatus 100 is an external apparatus that supplies image data to the displays 200 and 300. A PC, a media player, a DVD player, a TV, a game machine, and the like can be illustrated as the image output apparatus 100.

The image output apparatus 100 includes an image generating unit 101, a characteristic value detecting unit 102, a light emission brightness determining unit 103, a light emission brightness correcting unit 104, a multi-screen control unit 105, an image correcting unit 106, a smoothing correction coefficient determining unit 109, an image output unit 110, and a communication unit 111. The image correcting unit 106 includes a pixel value adjusting unit 107 and a smoothing processing unit 108.

The image generating unit 101 outputs image data of an image to be displayed in the multi-screen display system. The image data is configured by a plurality of frames. In the first embodiment, the image generating unit 101 reads out image data from a storage device (not shown in the figure) included in the inside of the image output apparatus 100. The image generating unit 101 may acquire the image data from the outside of the image output apparatus 100 via wired or radio communication means or may acquire the image data from an external recording medium such as an optical disk or a nonvolatile memory device.

The characteristic value detecting unit 102 detects a characteristic value of the image data input from the image generating unit 101. In the first embodiment, the characteristic value detecting unit 102 acquires a histogram of brightness (hereinafter referred to as brightness histogram) as the characteristic value. The characteristic value detecting unit 102 detects a brightness histogram of image regions corresponding to backlight control regions explained below.

The light emission brightness determining unit 103 acquires the brightness histogram detected by the characteristic value detecting unit 102 and determines light emission brightness of the backlight of each of the display 200 and the display 300 on the basis of the brightness histogram. The light emission brightness determining unit 103 determines light emission brightness for each of the backlight control regions (each of divided regions). The light emission brightness determining unit 103 acquires information concerning the backlight control regions from the multi-screen control unit 105. The light emission brightness determining unit 103 determines light emission brightness of the backlight control regions corresponding to image regions configured by pixels having a low pixel value (brightness) of image data to be low and determines light emission brightness of the backlight control regions corresponding to image regions configured by pixels having a high pixel value (brightness) of the image data to be high.

The light emission brightness correcting unit 104 corrects the light emission brightness of each of the backlight control regions determined by the light emission brightness determining unit 103. The light emission brightness correcting unit 104 corrects, on the basis of an instruction of the multi-screen control unit 105, light emission brightnesses of adjacent regions, which are the backlight control regions adjacent to a boundary with adjacent displays. The instruction for correction of the light emission brightnesses of the adjacent regions by the multi-screen control unit 105 is explained below. The light emission brightness correcting unit 104 transmits the corrected brightnesses to the displays via the communication unit 111.

The multi-screen control unit 105 acquires, from the display 200 and the display 300 connected thereto, via the communication unit 111, display information retained by the displays on the inside. Details of the display information are explained below. The multi-screen control unit 105 analyzes the acquired display information, determines whether multi-screen display is performed using the connected plurality of displays, and recognizes the arrangement of the displays in performing the multi-screen display. The multi-screen control unit 105 sets priority levels of the connected displays and retains information concerning the priority levels on the inside of the multi-screen control unit 105. The priority levels are used in determining parameters used in the multi-screen display system among image processing parameters included in the displays.

The multi-screen control unit 105 recognizes, from backlight information in the display information, backlight control regions (adjacent regions) of the displays that are in contact with a display boundary and instructs the light emission brightness correcting unit 104 to correct light emission brightnesses of the adjacent regions according to necessity.

The image correcting unit 106 is configured by the pixel value adjusting unit 107 and the smoothing processing unit 108. The image correcting unit 106 applies correction of a pixel value to image data output from the image generating unit 101 and outputs the image data after the correction to the image output unit 110.

The pixel value adjusting unit 107 acquires the light emission brightnesses after the correction from the light emission brightness correcting unit 104 and adjusts a pixel value of the input image data according to the acquired light emission brightnesses.

Specifically, the pixel value adjusting unit 107 acquires light emission brightnesses of all the backlight control regions and calculates, for each of the pixels, brightness of light made incident on the display panel. The pixel value adjusting unit 107 corrects a pixel value (transmittance) of the pixels such that display brightness determined from the pixel value and brightness of the incident light of the pixels reaches a target value (target brightness) determined in advance. In the first embodiment, the target brightness is determined according to the pixel values of the input image data. That is, when the display brightness is higher than the target brightness because the light emission brightness of the backlight increases, the pixel values are reduced to set the display brightness to the target brightness.

The smoothing processing unit 108 performs, using a smoothing correction coefficient explained below, smoothing processing for reducing a sudden change in display brightnesses among the backlight control regions. Specifically, when local dimming processing is carried out, light emission brightness of a part of the backlight control regions (a high brightness control region) is sometimes determined markedly higher than light emission brightness of the backlight control regions around the high brightness control region. Then, depending on an image, a sudden change in display brightness occurs in a boundary between the high brightness control region and the backlight control regions around the high brightness control region to cause deterioration in display image quality.

When there is a large light emission brightness difference among the backlight control regions, the smoothing processing is performed such that the display brightness gently changes. In the first embodiment, the smoothing processing is realized by correcting a pixel value of image data. A sudden change in the display brightness is suppressed by multiplying a pixel value of pixels around an image region corresponding to the high brightness control region with a coefficient inversely proportional to a distance from the image region corresponding to the high brightness control region.

The coefficient used herein is a smoothing correction coefficient. The smoothing correction coefficient is a coefficient for determining a smoothing gradient (width of the smoothing processing and a tilt of the smoothing processing) indicating a degree of smoothing in the smoothing processing. The smoothing processing unit 108 acquires a smoothing correction coefficient determined by the smoothing correction coefficient determining unit 109 and uses the smoothing correction coefficient for the smoothing processing. The smoothing processing may be realized by changing the light emission brightness of the backlight control regions around the high brightness control region. In this case, for example, if it is necessary to increase a value of light emission brightness in a dark region to a double of a value of the light emission brightness the present situation, the smoothing correction coefficient is 2. The smoothing processing is performed such that a backlight in the dark region in the present situation emits light at the light emission brightness having the value obtained by multiplying the light emission brightness of the dark region in the present situation with 2.

The smoothing correction coefficient determining unit 109 determines the smoothing correction coefficient used for the smoothing processing for correcting the pixel value of the image data in order to suppress the sudden change in the display brightness. The smoothing correction coefficient determining unit 109 acquires, from the multi-screen control unit 105, smoothing correction coefficient information of all the connected displays and determines a smoothing correction coefficient used in common in the multi-screen display system. In the first embodiment, the smoothing correction coefficient determining unit 109 acquires smoothing correction coefficient information of the display 200 and smoothing correction coefficient information of the display 300. The smoothing correction coefficient determining unit 109 determines, as the smoothing correction coefficient of the multi-screen display system, a smoothing correction coefficient of the display having a higher priority level set by the multi-screen control unit 105.

The image output unit 110 acquires arrangement information of the display 200 and the display 300 from the multi-screen control unit 105, generates (slices), from the image data, image data of regions to be displayed on the displays, and outputs the image data to the displays.

The communication unit 111 performs communication with the display 200 and the display 300 and performs reception of display information of the displays, transmission of light emission brightness information, and transmission and reception of control information. Specifically, the communication unit 111 is connected to communication units of the displays by means capable of performing wired or radio data communication. For example, in the case of the wired connection, the communication unit 111 and the communication units of the displays are connected by a cable of IEEE1394, Display Port, or the like.

The display 200 includes an image input unit 201, a display panel unit 202, a display information managing unit 203, a backlight unit 204, and a communication unit 205.

The image input unit 201 receives image data from the image output apparatus 100 and outputs the image data to the display panel unit 202.

The display panel unit 202 includes a display panel 2021, a driver 2022 configured to drive the display panel 2021, and a control board 2023 for controlling the driver 2022 on the basis of input image data. The display panel unit 202 displays an image based on image data output from the image input unit 201.

The display information managing unit 203 manages, as display information, various kinds of information stored by the display 200.

The display information is information peculiar to the display 200 set in the display 200. The display information also includes information concerning whether the display 200 is a display configuring the multi-screen display system. The display information is transmitted to the image output apparatus 100 via the communication unit 205 when the display 200 is connected to the image output apparatus 100.

In the first embodiment, the display information is set in the displays by a user or the like in advance.

The backlight unit 204 includes a backlight 2041 including one or more light sources, a control circuit 2042 configured to control a light source of the backlight 2041, and an optical unit 2043 such as a diffuser configured to diffuse light irradiated from a light source. The backlight 2041 is configured by a plurality of backlight control regions in which light emission brightness (a light emission amount) can be independently (individually) controlled. In the first embodiment, the backlight 2041 includes m×n backlight control regions consisting of m backlight control regions in the lateral direction (a direction parallel to a setting surface) and n backlight control regions in the longitudinal direction (a direction perpendicular to the setting surface) (m and n are integers). Light emission brightnesses of the backlight control regions are controlled by the control circuit 2042 according to light emission brightness acquired from the image output apparatus 100 via the communication unit 205.

In the backlight 2041, the backlight control regions are configured by one or a set of a plurality of minimum control units capable of independently controlling light emission. When the backlight control region is configured by one minimum control unit, one backlight control region cannot be divided by finer backlight control regions. When the backlight control region is configured by a plurality of minimum control units, the same light emission control is applied to the plurality of minimum control units configuring the same backlight control region. In this case, one backlight control region can be divided by finer backlight control regions.

The communication unit 205 acquires display information from the display information managing unit 203 and transmits the display information to the image output apparatus 100 when the display 200 is connected to the image output apparatus 100. The communication unit 205 receives light emission brightness information determined for each of the backlight control regions from the image output apparatus 100 and outputs the light emission brightness information to the backlight unit 204.

Specific processing for building the multi-screen display system is explained with reference to FIG. 1 to FIGS. 5A and 5B.

Figure 2A:
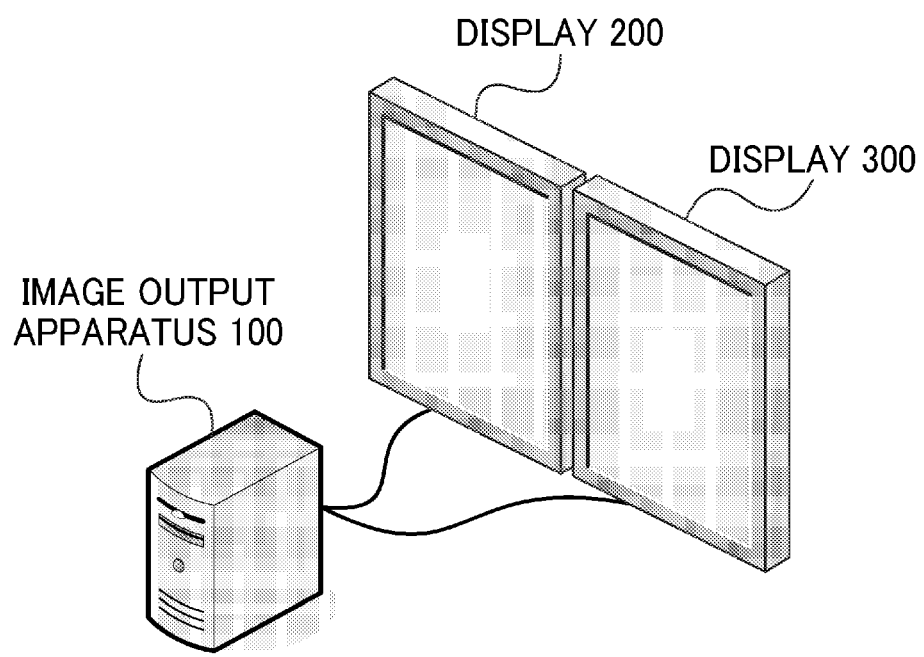
FIGS. 2A and 2B are diagrams showing the configuration of a multi-screen display system of including two displays in the first embodiment.

The multi-screen display system in the first embodiment is realized by arranging two displays (the display 200 and the display 300) side by side on the left and right as shown in FIG. 2A.

Figure 2B:
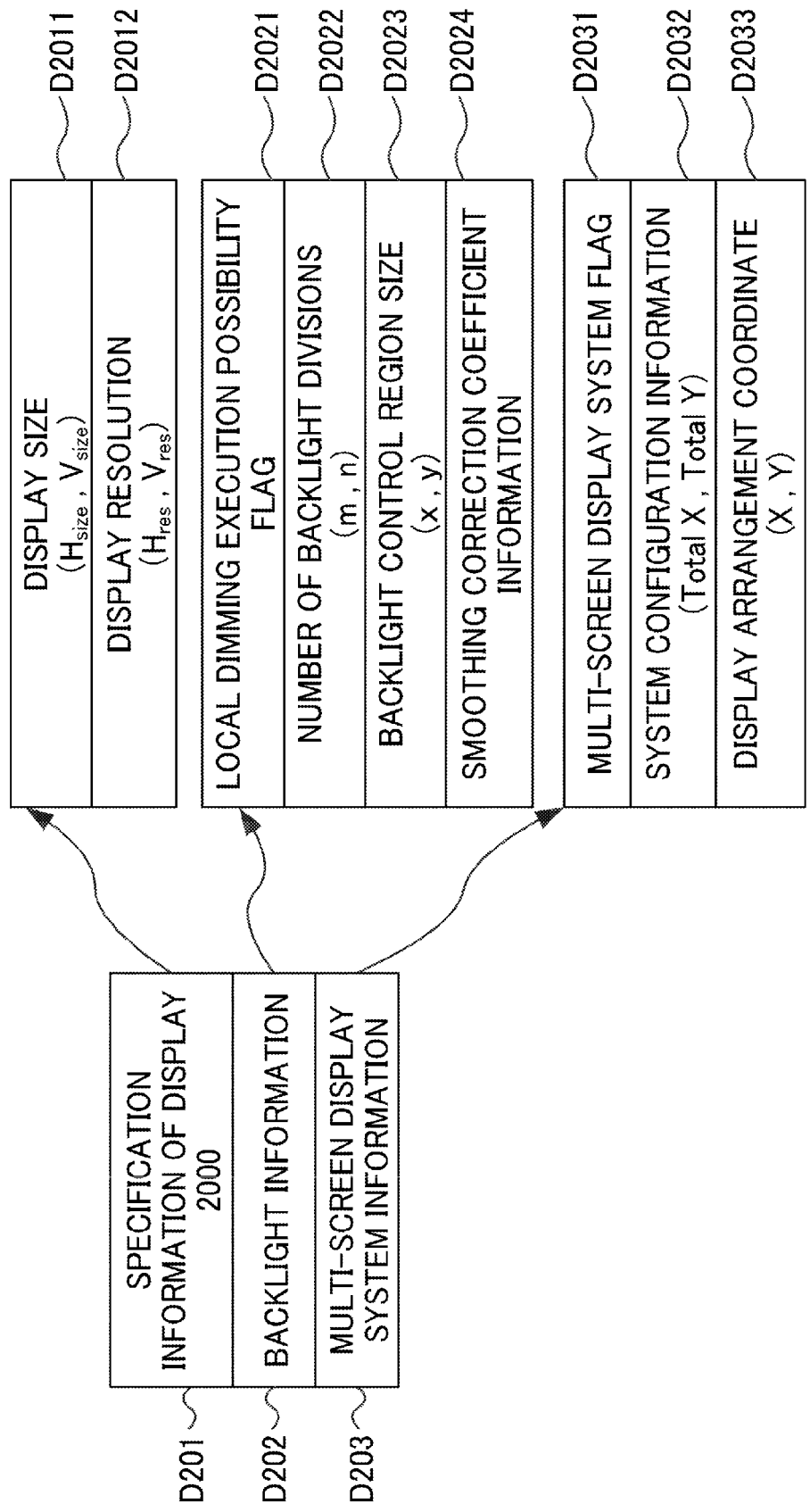

A data block diagram of display information transmitted to the image output apparatus 100 by the display 200 in the first embodiment is shown in FIG. 2B.

The display information is configured by specification information D201 concerning the display 200, backlight information D202 included in the display 200, and multi-screen display system information D203 built by the display 200. However, in the first embodiment, point information indicating detailed information data blocks of the respective data blocks D201, D202, and D203 is stored in the data blocks D201, D202, and D203.

The detailed information data block of the specification information D201 is configured by a display size D2011 and display resolution D2012. In the display size D2011, a horizontal size (Hsize) and a vertical size (Vsize) are described. In the display resolution D2012, resolution in the horizontal direction (Hres) and resolution in the vertical direction (Vres) are described.

The detailed information data block of the backlight information D202 is configured by a local dimming execution possibility flag D2021, a number of backlight divisions D2022, a backlight control region size D2023, and smoothing correction coefficient information D2024.

The local dimming execution possibility flag D2021 is information indicating whether a display includes a local dimming control function. When the display includes the local dimming control function, "1" is described in the local dimming execution possibility flag D2021. The display 200 in the first embodiment includes the local dimming control function. The local dimming execution possibility flag D2021 is "1".

In the number of backlight divisions D2022, the number of divisions in the horizontal direction (m) and the number of divisions in the vertical direction (n) by the backlight control regions are described.

In the backlight control region size D2023, horizontal sizes (x) and vertical sizes (y) of the backlight control regions are described.

In the smoothing correction coefficient information 2024, a coefficient of pixel value reduction processing used in the smoothing processing carried out by the smoothing processing unit 108 is described.

The detailed information data block of the multi-screen display system information D203 is configured by a multi-screen display system flag D2031, system configuration information D2032, and an arrangement coordinate D2033 of the display 200.

The multi-screen display system flag D2031 is information indicating whether the display 200 is a display that is performing multi-screen display (a display configuring the multi-screen display system). When the display 200 is performing the multi-screen display, "1" is described in the multi-screen display system flag D2031.

The system configuration information D2032 is information indicating an arrangement configuration of all displays configuring the multi-screen display system. The number of displays arranged in the horizontal direction (TotalX) and the number of displays arranged in the vertical direction (TotalY) are described in the system configuration information D2032.

The display arrangement coordinate D2033 is coordinate information indicating an arrangement position of the display 200 in the multi-screen display system. In the case of the display 200, (1, 1) is described in the display arrangement coordinate D2033 as a display arrangement coordinate.

Figure 3:
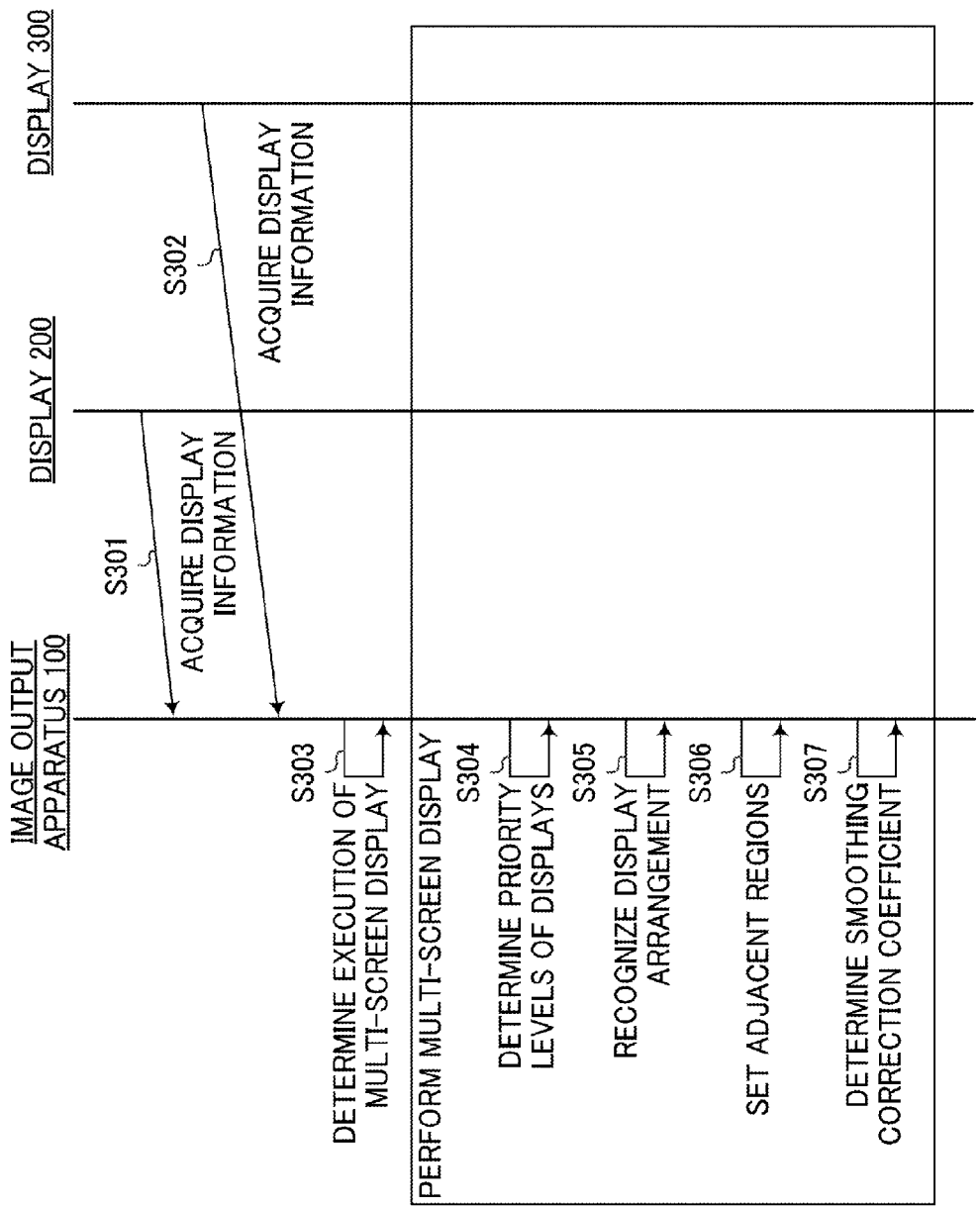
FIG. 3 is a flowchart for explaining initial setting necessary for building the multi-screen display system in the first embodiment.

FIG. 3 is a flowchart for explaining initial setting processing executed by the image output apparatus 100 when the multi-screen display system is built by the display 200 and the display 300. This processing is executed when the display 200 and the display 300 are connected to the image output apparatus 100.

When the display 200 and the display 300 are connected to the image output apparatus 100, the multi-screen control unit 105 acquires display information transmitted from the respective displays (S301 and S302).

The multi-screen control unit 105 analyzes the acquired display information and determines whether the multi-screen display is performed using the connected plurality of displays (S303).

Specifically, first, the multi-screen control unit 105 confirms from the display information of the display 200 and the display 300 that the multi-screen display system flag is and the local dimming execution possibility flag is "1".

In the first embodiment, when the two flags are "1", the multi-screen control unit 105 performs initial setting (S304 to S307) for realizing the multi-screen display.

It is assumed that display sizes, display resolutions, the numbers of divisions of the backlight control regions, and division sizes of the backlight control regions of the display 200 and the display 300 coincide with each other. When the display information is acquired and these kinds of information do not coincide with each other, the multi-screen control unit 105 may execute backlight control for disabling the local dimming control function of the displays. When the numbers of divisions of the backlight control regions, the sizes of the backlight control regions, and the arrangement configurations of the backlight control regions of the displays do not coincide with each other, it is possible to perform the multi-screen display by performing control explained in a second embodiment below.

The initial setting for realizing the multi-screen display is explained below.

First, the multi-screen control unit 105 determines priority levels between the displays configuring the multi-screen display system (S304).

The priority levels are used in determining, when light emission brightness of a display boundary is adjusted in the local dimming processing in the multi-screen display system, to which of the displays the light emission brightness is adjusted. A specific method of adjusting the light emission brightness is explained below.

In the first embodiment, the priority levels are set for the displays by user operation. The priority level of the display 200 is set higher than the priority level of the display 300.

Subsequently, the multi-screen control unit 105 recognizes a positional relation of the arrangement of the display 200 and the display 300 from the system configuration information and the display arrangement coordinate (S305).

The multi-screen control unit 105 sets, as adjacent regions, the backlight control regions in contact with the display boundary among the backlight control regions of the display 200 and the display 300 (S306). In the first embodiment, as shown in FIG. 2A, the display 200 and the display 300 are set side by side on the left and right. In the display 200, the backlight control region present at the rightmost end is the adjacent region. In the display 300, the backlight control region present at the leftmost end is the adjacent region.

The smoothing correction coefficient determining unit 109 determines a smoothing correction coefficient of the multi-screen processing system (S307). Specifically, the smoothing correction coefficient determining unit 109 checks smoothing correction coefficient information of the displays acquired by the multi-screen control unit 105 and sets, as the smoothing correction coefficient of the multi-screen processing system, a smoothing correction coefficient of the display having the higher priority level (the display 200).

The initial setting for realizing the multi-screen display in the first embodiment is as explained above.

A processing flow executed by the image output apparatus 100 in order to suppress a brightness difference that occurs in the boundary between the display 200 and the display 300 is explained with reference to FIG. 4. This processing is executed for each one frame of image data to be output.

The characteristic value detecting unit 102 of the image output apparatus 100 detects a brightness histogram, which is a characteristic value of image data (S401).

The light emission brightness determining unit 103 acquires the brightness histogram detected by the characteristic value detecting unit 102 and determines light emission brightness of the backlight 2041 on the basis of the brightness histogram. At this point, the light emission brightness determining unit 103 acquires the number of divisions and a size of the backlight control regions of the display 200 from the multi-screen control unit 105 and calculates light emission brightness for each of the backlight control regions. Similarly, the light emission brightness determining unit 103 also calculates light emission brightness of each of the backlight control regions of the backlight of the display 300 (S402).

The light emission brightness correcting unit 104 acquires the light emission brightness of each of the backlight control regions of the display 200 and the display 300 from the light emission brightness determining unit 103. Further, the light emission brightness correcting unit 104 acquires information concerning the adjacent regions of the display 200 and the display 300 from the multi-screen control unit 105. The light emission brightness correcting unit 104 calculates, for each of the adjacent regions, a difference value between the light emission brightnesses of the adjacent regions of the display 200 and the light emission brightnesses of the adjacent regions of the display 300 adjacent to the adjacent regions of the display 200 in the lateral direction (S403).

When the difference value calculated in S403 is larger than a predetermined threshold, the light emission brightness correcting unit 104 corrects the light emission brightnesses of the adjacent regions on the basis of the priority levels determined in S304 (S404).

In the first embodiment, since the priority level of the display 200 is higher than the priority level of the display 300, the light emission brightness correcting unit 104 corrects the light emission brightnesses of the adjacent regions of the display 300 to be the same values as the light emission brightnesses of the adjacent regions of the display 200.

The pixel value adjusting unit 107 acquires the light emission brightness after the correction from the light emission brightness correcting unit 104 and adjusts a pixel value of input image data according to the acquired light emission brightness (S405). The light emission brightness acquired from the light emission brightness correcting unit 104 represents the brightness of light from the backlight made incident on pixels of the image data.

The smoothing processing unit 108 acquires the smoothing correction coefficient information determined in S307 from the smoothing correction coefficient determining unit 109 and applies, on the basis of the smoothing correction coefficient, smoothing processing to the image data adjusted by the pixel value adjusting unit 107 (S406).

The image output unit 110 acquires the image data from the smoothing processing unit 108, generates, on the basis of the display arrangement recognized in S305, from the image data, image data of an image to be displayed on the displays, and outputs the generated image data to the displays (S407).

The communication unit 111 acquires light emission brightness of each of the backlight control regions from the light emission brightness determining unit 103 and transmits the light emission brightness to the displays (S408).

The display 200 controls light emission of the backlight 2041 on the basis of the light emission brightness received by the communication unit 205 and controls the transmittance of the display panel unit 202 on the basis of the image data input to the image input unit 201 to display an image (S409). The display 300 performs the same processing and displays the image (S410).

Correction processing for light emission brightnesses for the adjacent regions of the display 300 is specifically explained with reference to FIGS. 5A and 5B.

Figure 5A:
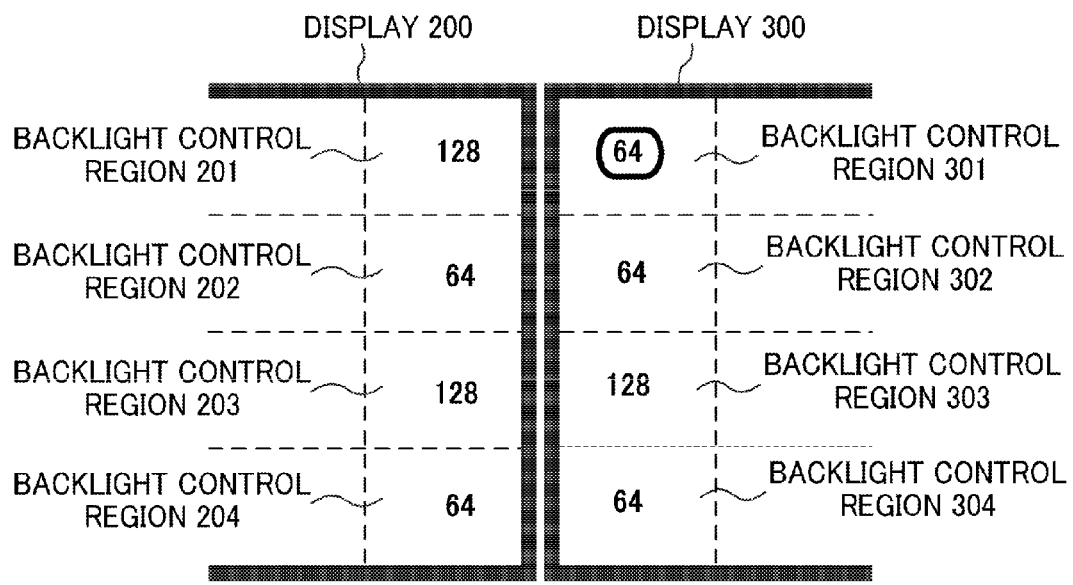
FIGS. 5A and 5B are diagrams showing light emission brightness of each of backlight control regions of the display in the first embodiment.

FIG. 5A is a diagram showing light emission brightnesses before correction of the adjacent regions of the display 200 and the display 300. FIG. 5B is a diagram showing light emission brightnesses after the correction of the adjacent regions.

Figure 5B:
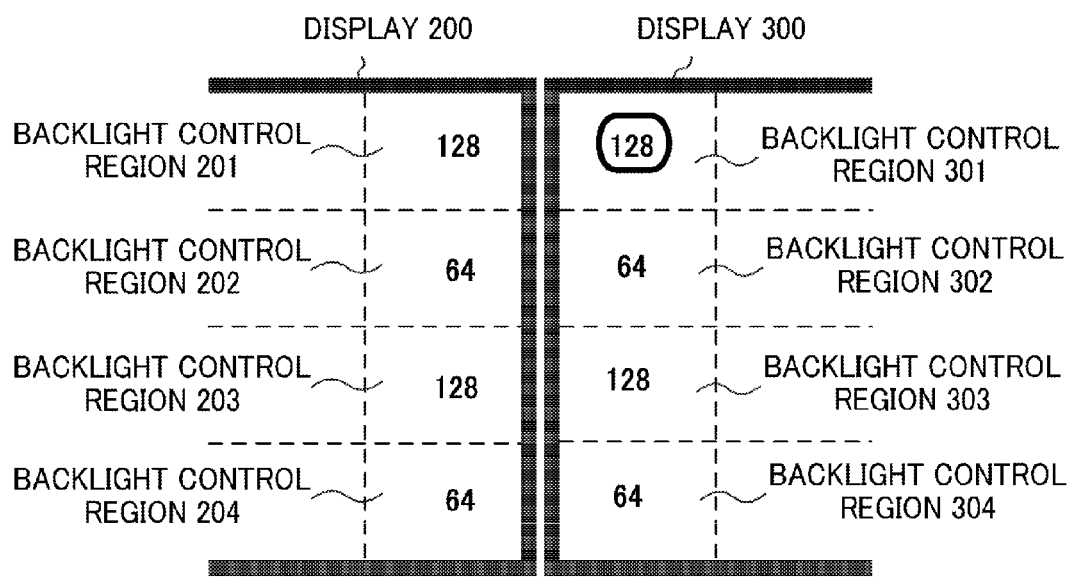

In FIGS. 5A and 5B, a backlight control region 301 of the display 300 is adjacent to a backlight control region 201 of the display 200 in the lateral direction. A backlight control region 302 of the display 300 is adjacent to a backlight control region 202 of the display 200 in the lateral direction. A backlight control region 303 of the display 300 is adjacent to a backlight control region 203 of the display 200 in the lateral direction. A backlight control region 304 of the display 300 is adjacent to a backlight control region 204 of the display 200 in the lateral direction.

Numerical values described in the backlight control regions shown in FIG. 5A are the light emission brightnesses determined in S402. The light emission brightnesses of the backlight control regions 201, 202, 203, and 204 of the display 200 are respectively 128, 64, 128, and 64. The light emission brightnesses of the backlight control regions 301, 302, 303, and 304 of the display 300 are respectively 64, 64, 128, and 64.

In the processing in S403, a difference value between the light emission brightnesses of the adjacent regions adjacent to each other is calculated. In the first embodiment, an absolute value of a difference value between the light emission brightnesses of the backlight control region 301 of the display 300 and the backlight control region 201 of the display 200 is 64. When a threshold of the difference value between the light emission brightnesses is set to 16, the backlight control region 301 is a correction target for light emission brightness. The backlight control regions 302, 303, and 304 are not the correction target.

In S404, the light emission brightness correcting unit 104 corrects the light emission brightness (64) of the backlight control region 301 of the display 300. The light emission brightness correcting unit 104 corrects the light emission brightness (64) of the backlight control region 301 to be the same value as the light emission brightness (128) of the backlight control region 201 of the display 200 having the high priority level adjacent to the backlight control region 301 in the lateral direction and changes the light emission brightness to 128.

According to the processing explained above, it is possible to reduce a difference between the light emission brightnesses between the backlight control regions in the boundary portion between the displays configuring the multi-screen display system. (In the first embodiment, it is possible to eliminate the brightness difference). As a result, in the multi-screen display system, it is possible to suppress discontinuity of the display brightness in the boundary portion between the displays and perform the multi-screen display at high image quality.

In the first embodiment, the brightness histogram is used as the characteristic value detected from the image data by the characteristic value detecting unit 102. However, the characteristic value is not limited to this. For example, it is assumed that one light source of the backlight 2041 is configured by combining three LEDs, i.e., a red (R) LED, a green (G) LED, and a blue (B) LED and light emission brightnesses of light sources of the LEDs of RGB are controlled according to RGB values of input image data. In this case, the characteristic value detecting unit 102 may detect histograms of the respective RGB values of the input image data. The light emission brightness determining unit 103 may determine light emission brightnesses of the LEDs of RGB on the basis of the histograms of RGB. The characteristic value detecting unit 102 may acquire, as characteristic values, a maximum and an average of brightness instead of the brightness histograms of the image regions corresponding to the backlight control regions.

In the first embodiment, the priority levels are set for the displays. The light emission brightness of the adjacent region of the display having the low priority level is adjusted to the light emission brightness of the adjacent region of the display having the high priority level. However, it is also possible to, without setting the priority levels for the displays, compare light emission brightnesses between the adjacent regions and adjust the lower light emission brightness to the higher light emission brightness. Alternatively, it is also possible to compare light emission brightness between the adjacent regions and adjust the higher light emission brightness to the lower light emission brightness.

In the first embodiment, the multi-screen display system is configured by the two displays. However, it is also conceivable to configure the multi-screen display system using a larger number of displays. In that case, processing for increasing a priority level of a display arranged in the center of a plurality of displays arranged side by side may be performed on the basis of a display arrangement coordinate.

Second Embodiment

In the first embodiment, the method of suppressing discontinuity of display brightness in the display boundary when the multi-screen display system is configured using the plurality of displays having the same number of divisions and the same division size of the backlight control regions is explained.

In a second embodiment, a method of suppressing discontinuity of display brightness in a display boundary when a multi-screen display system is configured using a plurality of displays having different numbers of divisions and different division sizes of backlight control regions is explained. Specifically, in the second embodiment, processing for lighting all backlight control regions arranged side by side across the display boundary at light emission brightnesses of the same value is performed. A determining method for light emission brightness in the second embodiment is explained in detail below.

Figure 6:
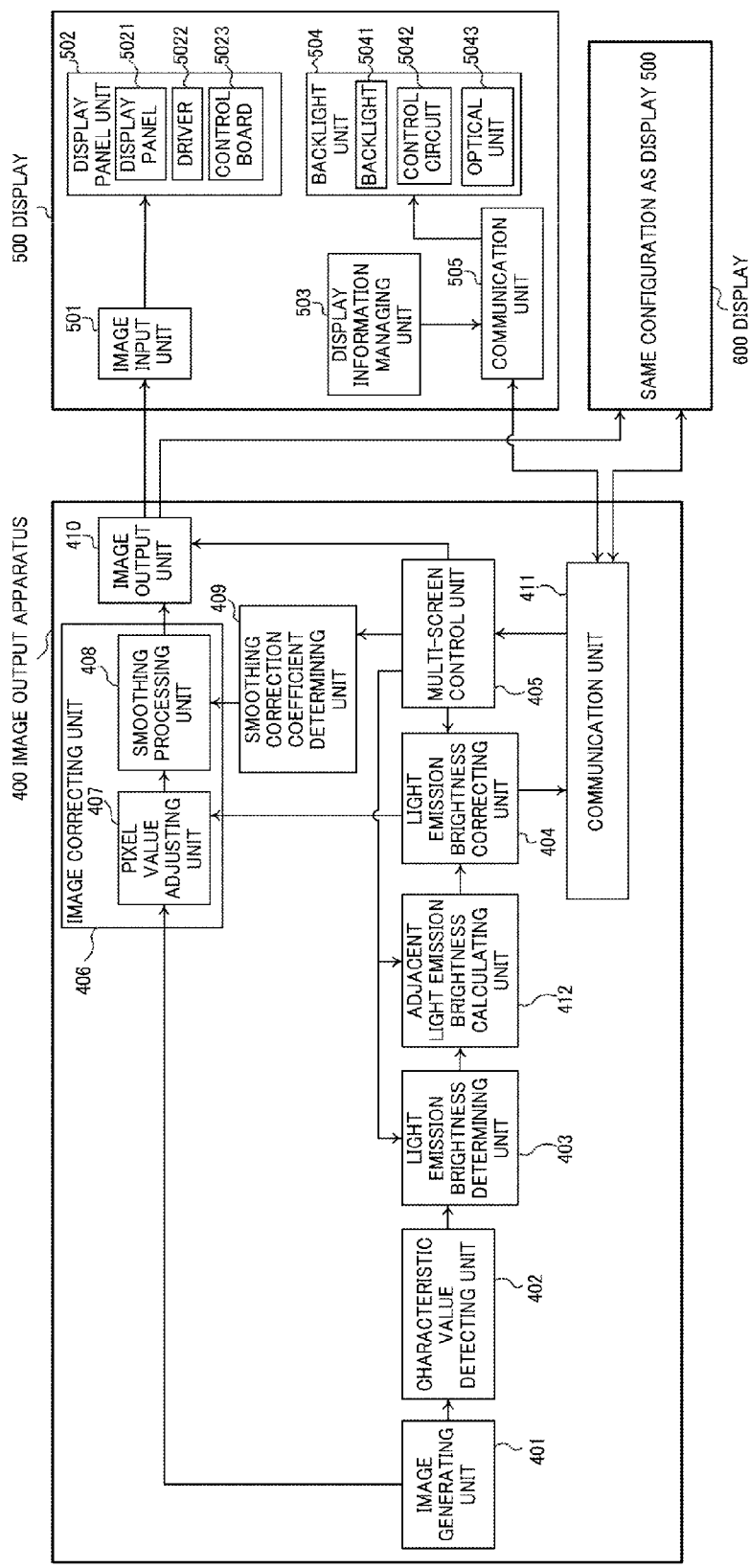
FIG. 6 is a block diagram showing the schematic configuration of a display in a second embodiment.

FIG. 6 is a block diagram showing the schematic configuration of an image output apparatus 400 and a display 500 in the second embodiment. In the image output apparatus 400 shown in FIG. 6, blocks 401 to 411 have functions same as the functions of the blocks 101 to 111 shown in FIG. 1 in the first embodiment. In the display 500, blocks 501 to 505 have functions same as the functions of the blocks 201 to 205 shown in FIG. 1 in the first embodiment. Detailed explanation of the same functions is omitted.

An adjacent light emission brightness calculating unit 412 included in the image output apparatus 400 calculates light emission brightness (common light emission brightness) in lighting all adjacent regions of the display 500 and all adjacent regions of a display 600 at the same light emission brightness. In the second embodiment, the adjacent light emission brightness calculating unit 412 calculates the common light emission brightness according to an instruction of a multi-screen control unit 405.

Figure 7:
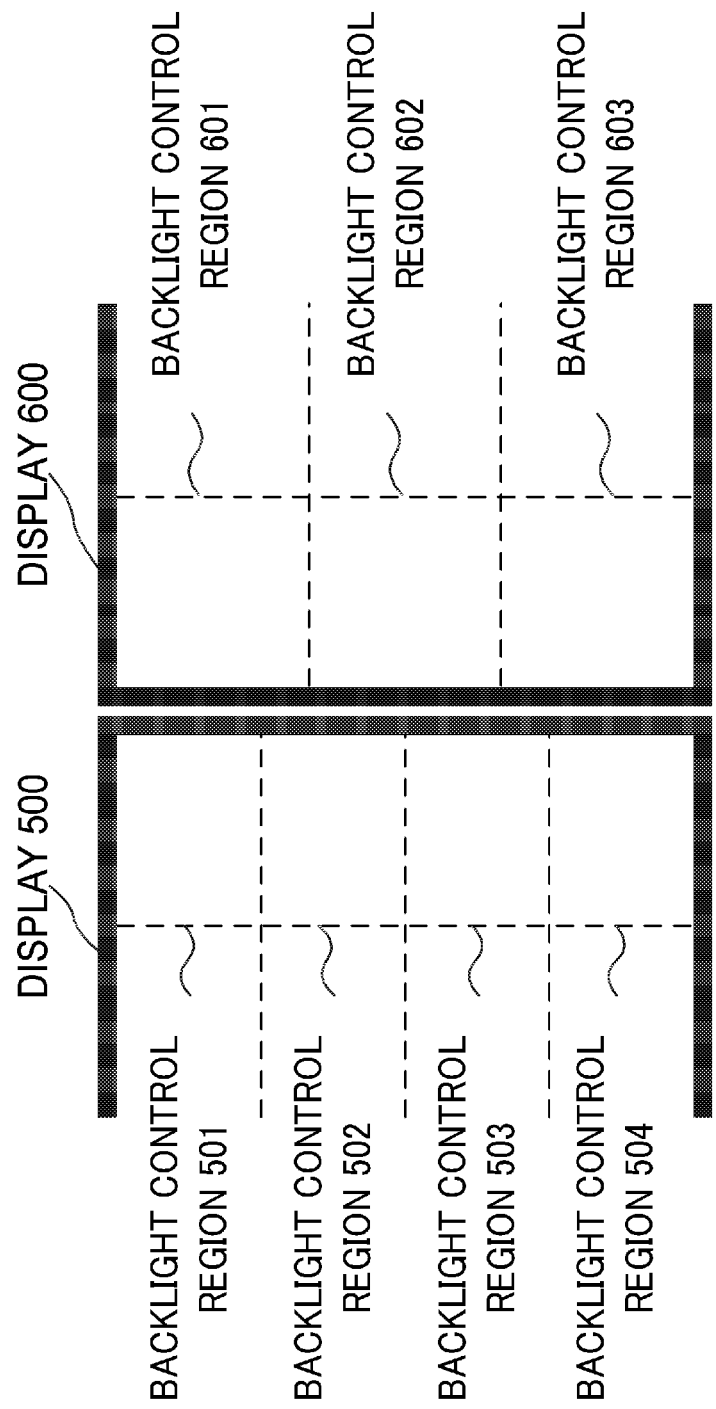
FIG. 7 is an explanatory diagram showing backlight control regions of the display in the second embodiment.

FIG. 7 is an explanatory diagram for explaining backlight control regions of the display 500 and the display 600 in the second embodiment. Backlight control regions 501 to 504 of the display 500 are adjacent regions adjacent to a boundary with the display 600 in the display 500. Backlight control regions 601 to 603 of the display 600 are adjacent regions adjacent to the boundary with the display 500 in the display 600.

FIG. 8 is a flowchart for explaining initial setting processing executed by the image output apparatus 400 in building a multi-screen display system using the display 500 and the display 600. This processing is executed when the display 500 and the display 600 are connected to the image output apparatus 400.

In the second embodiment, as in the first embodiment, as shown in FIG. 2A, the multi-screen display system is realized by arranging the two displays on the left and right. As in the first embodiment, display information in the second embodiment adopts the data configuration shown in FIG. 2B.

First, when the display 500 and the display 600 are connected to the image output apparatus 400, the multi-screen control unit 405 of the image output apparatus 400 performs processing same as S301 to S303 of FIG. 3 in the first embodiment and determines whether the multi-screen display is performed (S801).

In the second embodiment, as in the first embodiment, the multi-screen control unit 405 confirms that the multi-screen display system flag of the display information of the display 500 and the display 600 is "1" and performs the multi-screen display.

Subsequently, the multi-screen control unit 405 performs initial setting for realizing the multi-screen display.

The multi-screen control unit 405 performs processing same as S305 to S307 of FIG. 3 in the first embodiment and performs check of the arrangement of the displays, setting of adjacent regions, and determination of a smoothing correction coefficient (S802).

In S802, the multi-screen control unit 405 does not perform the processing in S304 of FIG. 3 in the first embodiment (determination of priority levels). A reason for this is as follows. In the light emission brightness correction processing in the first embodiment (FIG. 4), the correction of the light emission brightness of the adjacent region of the display having the low priority level is performed on the basis of the priority levels between the displays configuring the multi-screen display system determined during the initial setting (S304) (S404). However, in light emission brightness correction processing in the second embodiment (FIG. 9), all adjacent regions present in the display boundary are set as correction targets of light emission brightness. Therefore, the processing for determining priority levels of the displays is unnecessary. Specific processing is explained below.

The initial setting for realizing the multi-screen display in the second embodiment is as explained above.

A processing flow executed by the image output apparatus 400 in order to suppress a brightness difference that occurs in the display boundary is explained with reference to FIG. 9. This processing is executed for each one frame of image data to be output.

Figure 4:
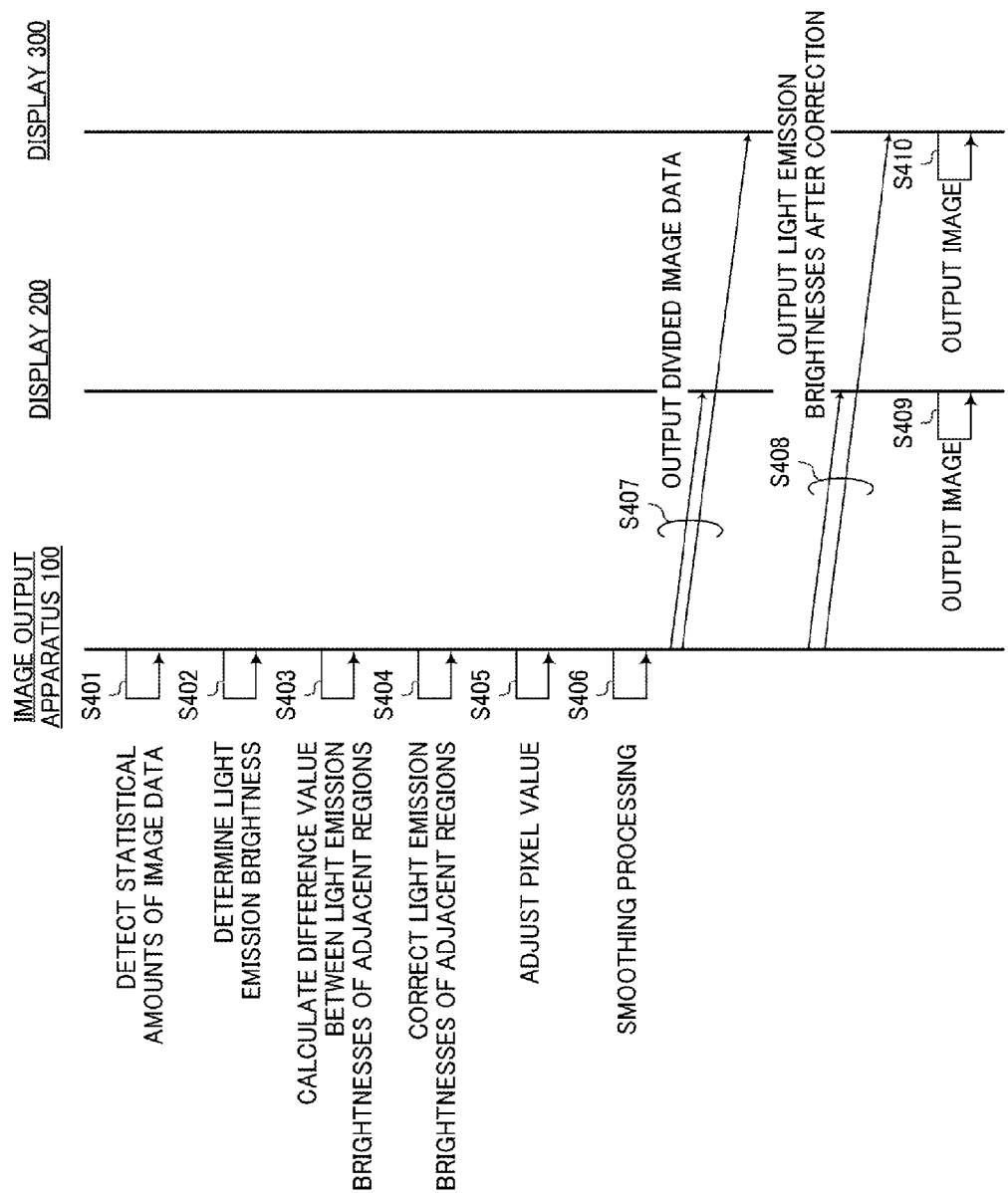
FIG. 4 is a flowchart for explaining processing for setting light emission brightnesses near a display boundary to coincide with each other in the first embodiment.

First, a characteristic value detecting unit 402 and a light emission brightness determining unit 403 of the image output apparatus 400 perform processing same as S401 to S402 in FIG. 4 in the first embodiment and calculate light emission brightness of each of the backlight control regions from a characteristic value of image data (S901).

Subsequently, the adjacent light emission brightness calculating unit 412 calculates common light emission brightnesses used as target values of correction in light emission brightness correction for adjacent regions (S902).

A calculation method for the common light emission brightness is explained in detail with reference to FIGS. 10A and 10B.

First, the adjacent light emission brightness calculating unit 412 checks whether the numbers of divisions and the sizes of the backlight control regions coincide with each other between the displays from the backlight information of the display information of the displays acquired by the multi-screen control unit 405. When the numbers of divisions and the sizes do not coincide with each other, the adjacent light emission brightness calculating unit 412 carries out processing for calculating the common light emission brightness.

Subsequently, the adjacent light emission brightness calculating unit 412 calculates a lighting area for each of light emission brightnesses of the adjacent regions on the basis of the adjacent region information acquired from the multi-screen control unit 405 and the light emission brightnesses acquired from the light emission brightness determining unit 403. In the second embodiment, the adjacent light emission brightness calculating unit 412 checks light emission brightnesses of the adjacent regions and sets, as the common light emission brightness, light emission brightness set in a largest area among the light emission brightnesses of the adjacent regions.

Figure 10A:
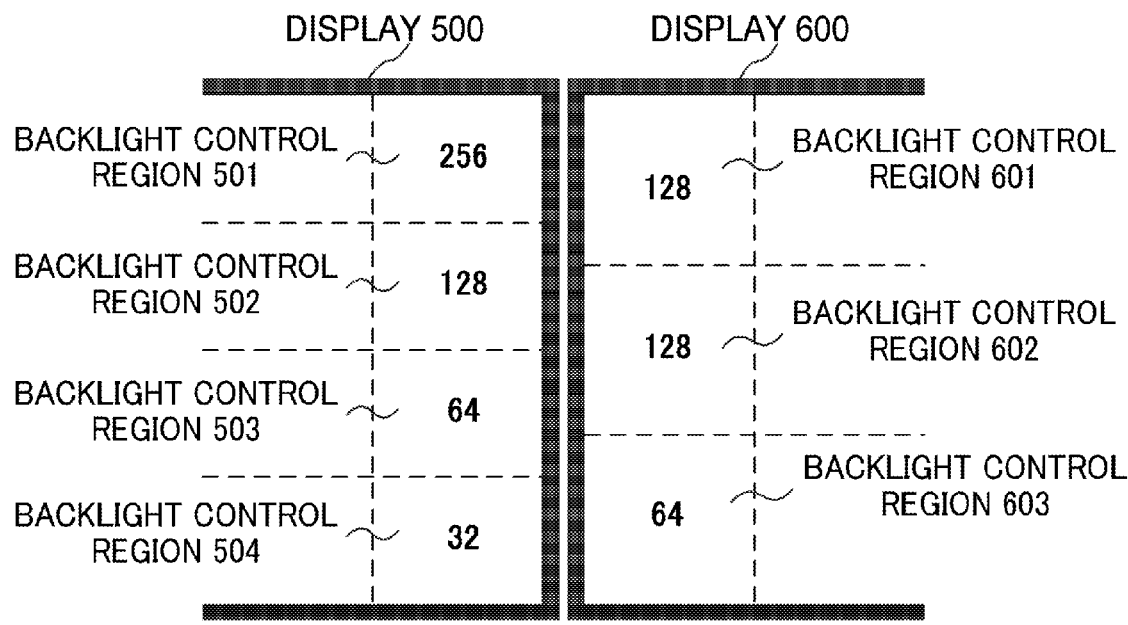
FIGS. 10A and 10B are diagrams showing light emission brightness of each of backlight control regions of the display in the second embodiment.

FIG. 10A is a diagram showing an example of light emission brightness of each of the adjacent regions determined according to input image data.

Light emission brightnesses of the backlight control regions 501, 502, 503, and 504 of the display 500 are respectively determined as 256, 128, 64, and 32 on the basis of statistical values (a brightness histogram) of image data. Light emission brightnesses of the backlight control regions 601, 602, and 603 of the display 600 are respectively determined as 128, 128, and 64 on the basis of statistical values (a brightness histogram) of image data.

A ratio of a size (an area) of one backlight control region of the display 500 and a size (an area) of one backlight control region of the display 600 is 3:4. A total of areas of all the adjacent regions of the display 500 and the display 600 (a total of areas of the backlight control regions 501 to 504 and the backlight control regions 601 to 603) is set to 24. Then, an area of the backlight control regions lit at the light emission brightness of 256 is 3. Similarly, an area of the backlight control regions lit at the light emission brightness of 128 is 11. An area of the backlight control region lit at the light emission brightness of 64 is 7. An area of the backlight control region lit at the light emission brightness of 32 is 3.

Therefore, since the light emission brightness having a largest total of the areas of the backlight control regions for which the light emission brightness is set is 128, the adjacent light emission brightness calculating unit 412 sets 128 as the common light emission brightness.

If there are a plurality of light emission brightnesses having a largest total of the areas of the backlight control regions for which the light emission brightness is set, the adjacent light emission brightness calculating unit 412 sets higher light emission brightness as the common light emission brightness.

The adjacent light emission brightness calculating unit 412 outputs the calculated common light emission brightness to the light emission brightness correcting unit 404.

Figure 10B:
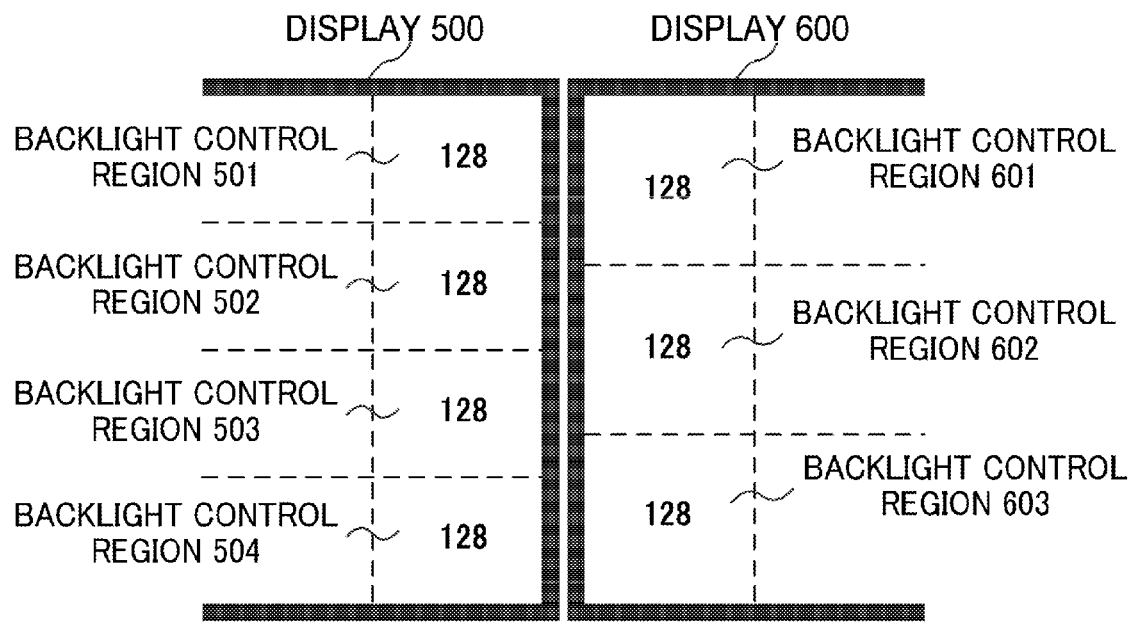

As shown in FIG. 10B, the light emission brightness correcting unit 404 corrects the light emission brightnesses of the adjacent regions such that the light emission brightnesses of all the adjacent regions are the common light emission brightness. The image output apparatus 400 carries out adjustment of pixel values of the image data and smoothing processing on the basis of the corrected light emission brightnesses as in the first embodiment, and outputs image data divided for each display and the light emission brightnesses after the correction to the respective displays (S903).

According to the processing explained above, it is possible to reduce a display brightness difference in the boundary portion between the displays in the multi-screen display system configured by the plurality of displays having the local dimming control function and having the different division configurations of the backlight control regions each other.

In the second embodiment, when the common light emission brightness of the adjacent regions is calculated, the light emission brightness having the largest total of the areas of the backlight control region, for which the light emission region is set, is set as the common light emission brightness. However, the highest light emission brightness among the light emission brightnesses of the adjacent regions may be set as the common light emission brightness.

Further, for each of the light emission brightnesses, when a total of the areas of the backlight control regions, for which the light emission brightness is set, is calculated, the total of the areas may be calculated by weighting the areas in proportion to the light emission brightness. Consequently, high light emission brightness is preferentially set as the common light emission brightness.

Third Embodiment

In the first and second embodiments, the image output apparatus includes the light emission brightness determining unit and the light emission brightness correcting unit. In the method explained in the first and second embodiments, the image output apparatus performs the determination and the correction of the backlight light emission brightnesses of all the connected displays to thereby suppress discontinuity of display brightness between the displays.

In a third embodiment, a method of suppressing discontinuity of display brightness in a display boundary when a multi-screen display system is configured using displays including a light emission brightness determining unit and a light emission brightness correcting unit is explained. Specifically, the image output apparatus acquires light emission brightnesses of adjacent regions from the connected displays, calculates a correction value for the light emission brightnesses of the adjacent regions, and outputs the correction value to the displays. The displays light backlights on the basis of corrected light emission brightnesses acquired from the image output apparatus. A light emission brightness correcting method in the third embodiment is explained in detail below.

Figure 11:
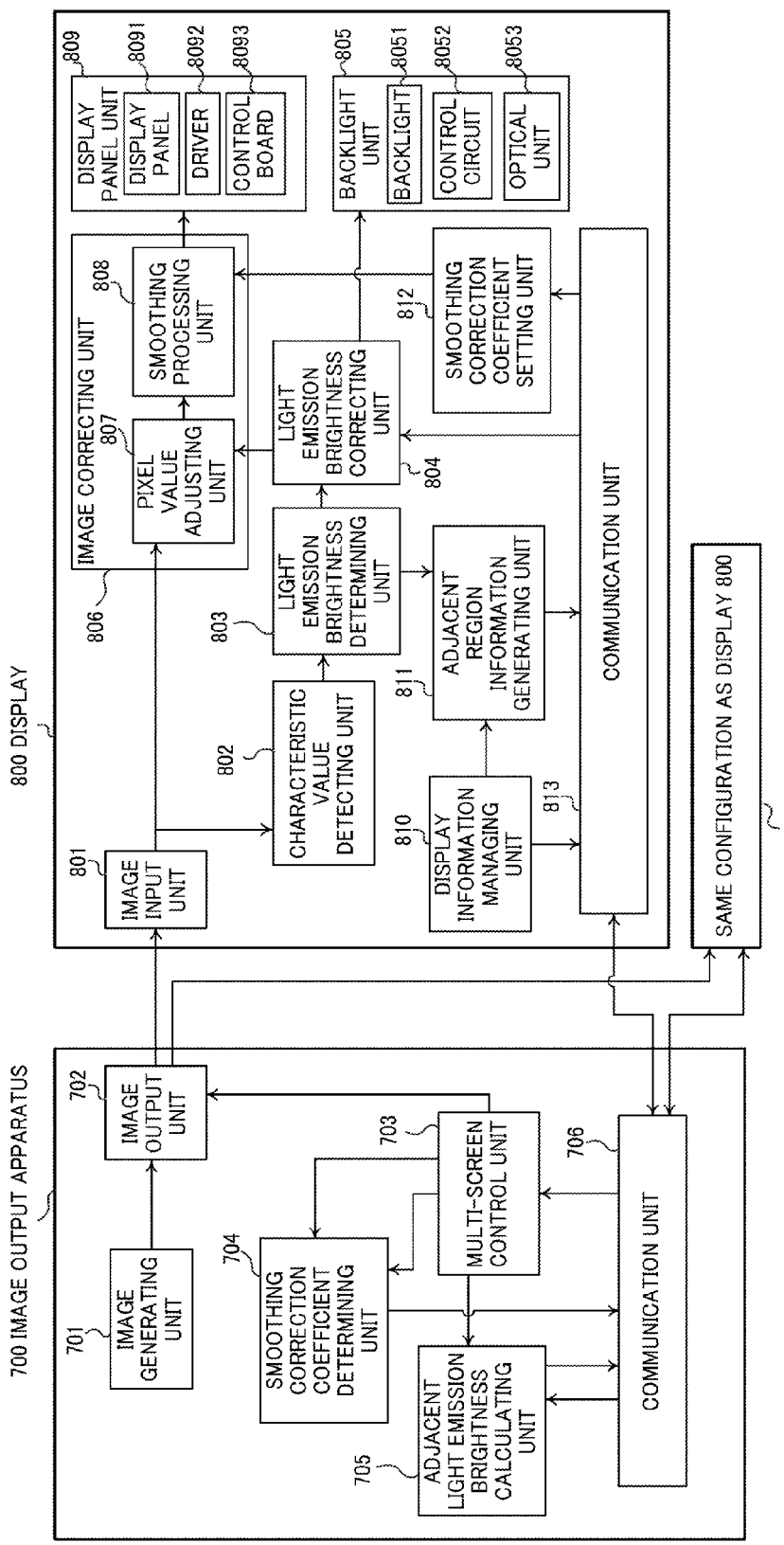
FIG. 11 is a block diagram showing the schematic configuration of a display in a third embodiment.

In the third embodiment, as shown in FIG. 11, the multi-screen display system is built using an image output apparatus 700, a display 800, and a display 900. In the third embodiment, as in the first embodiment, as shown in FIG. 2A, the two displays are arranged on the left and right. The display 800 is arranged on the left and the display 900 is arranged on the right. As in the first embodiment, display information in the third embodiment adopts the data configuration shown in FIG. 2B. It is assumed that screen sizes, resolutions, the numbers of divisions of the backlight control regions, and division sizes of the backlight control regions of the displays coincide with each other between the displays.

FIG. 11 is a block diagram showing the schematic configuration of the image output apparatus 700 and the display 800 in the third embodiment. The display 900 has a configuration same as the configuration of the display 800.

The image output apparatus 700 includes an image generating unit 701, an image output unit 702, a multi-screen control unit 703, a smoothing correction coefficient determining unit 704, an adjacent light emission brightness calculating unit 705, and a communication unit 706.

The image generating unit 701 outputs image data of an image to be displayed in the multi-screen display system. The image data is configured by a plurality of frames. In the third embodiment, the image generating unit 701 reads out the image data from a storage device (not shown in the figure) includes in the inside the image output apparatus 700. The image generating unit 701 may acquire the image data from the outside of the image output apparatus 700 via wired or radio communication means or may acquire the image data from an external recording medium such as an optical disk or a nonvolatile memory device.

The image output unit 702 acquires arrangement information of the display 800 and the display 900 from the multi-screen control unit 703 explained below, generates (slices), from the image data, image data of regions to be displayed in the displays, and outputs the image data to the displays.

The multi-screen control unit 703 acquires, from the display 800 and the display 900 connected to the image output apparatus 700, via the communication unit 706, display information to be retained on the inside by the displays. As in the first embodiment, the display information in the third embodiment adopts the data configuration shown in FIG. 2B.

The multi-screen control unit 703 analyzes the acquired display information, determines whether the multi-screen display is performed using a plurality of displays connected to the image output apparatus 700 and recognizes the arrangement of the displays in performing the multi-screen display. The multi-screen control unit 703 sets priority levels of the displays connected to the image output apparatus 700 and retains information concerning the priority levels on the inside of the multi-screen control unit 703.

The smoothing correction coefficient determining unit 704 acquires smoothing correction coefficient information of all the connected displays from the multi-screen control unit 703 and determines a smoothing correction coefficient used in common in the multi-screen display system. In the third embodiment, the smoothing correction coefficient determining unit 704 acquires smoothing correction coefficient information of the display 800 and smoothing correction coefficient information of the display 900. The smoothing correction coefficient determining unit 704 sets, as the smoothing correction coefficient of the multi-screen display system, the smoothing correction coefficient of the display having the higher priority level set by the multi-screen control unit 703. The smoothing correction coefficient determining unit 704 outputs the determined smoothing correction coefficient to the displays via the communication unit 706.

The adjacent light emission brightness calculating unit 705 acquires adjacent region information from the displays via the communication unit 706. The adjacent region information is information in which adjacent regions and light emission brightnesses determined concerning the adjacent regions (determined by a light emission brightness determining unit 803 explained below) are associated. The adjacent region information is generated by the display 800 and the display 900. The adjacent light emission brightness calculating unit 705 calculates, on the basis of the acquired adjacent region information and the display arrangement information acquired from the multi-screen control unit 703, corrected light emission brightness of each of the adjacent regions used as a target value of correction in light emission brightness correction for the adjacent regions (performed by a light emission brightness correcting unit 804 explained below). A detailed calculation method for corrected light emission brightnesses is explained below. The adjacent light emission brightness calculating unit 705 associates calculated corrected light emission brightnesses with the adjacent regions and outputs the corrected light emission brightnesses to the displays via the communication unit 706.

The communication unit 706 performs communication with the display 800 and the display 900 and performs reception of display information and transmission and reception of light emission brightness and information concerning control regions. Specifically, the communication unit 706 is connected to communication units of the displays by means capable of performing wired or radio data communication. For example, in the case of the wired connected, the communication unit 706 and the communication units of the displays are connected by a cable of IEEE1394, Display Port, or the like.

The display 800 includes an image input unit 801, a characteristic value detecting unit 802, a light emission brightness determining unit 803, a light emission brightness correcting unit 804, a backlight unit 805, an image correcting unit 806, a display panel unit 809, and a display information managing unit 810. The display 800 further includes an adjacent region information generating unit 811, a smoothing correction coefficient setting unit 812, and a communication unit 813.

The backlight unit 805 includes a backlight 8051 including one or more light sources, a control circuit 8052 configured to control the light sources of the backlight 8051, and an optical unit 8053 such as a diffuser configured to diffuse light irradiated from the light sources.

The image correcting unit 806 includes a pixel value adjusting unit 807 and a smoothing processing unit 808.

The display panel unit 809 includes a display panel 8091, a driver 8092 configured to drive the display panel 8091, and a control board 8093 for controlling the driver 8092 on the basis of input image data.

The image input unit 801 receives image data from the image output apparatus 700.

The characteristic value detecting unit 802 detects a characteristic value of the image data input to the image input unit 801. In the third embodiment, the characteristic value detecting unit 802 detects a brightness histogram as the characteristic value.

The light emission brightness determining unit 803 acquires the brightness histogram detected by the characteristic value detecting unit 802 and determines light emission brightnesses of the backlights of the display 800 and the display 900 on the basis of the brightness histogram. The light emission brightness determining unit 803 determines light emission brightness of a backlight control region corresponding to an image region configured by pixels having a low pixel value (brightness) of image data to be low and determines light emission brightness of a backlight control region corresponding to an image region configured by pixels having a high pixel value (brightness) of image data to be high.

The light emission brightness correcting unit 804 corrects, on the basis of correction information for light emission brightness input from the outside of the display, the light emission brightness of each of the backlight control regions acquired from the light emission brightness determining unit 803. The light emission brightness correcting unit 804 acquires the corrected light emission brightnesses associated with the adjacent regions from the adjacent light emission brightness calculating unit 705 of the image output apparatus 700 via the communication unit 813 and overwrites the light emission brightnesses of the adjacent regions acquired from the light emission brightness determining unit 803 with the acquired corrected light emission brightnesses.

The backlight 8051 is configured by a plurality of backlight control regions in which light emission brightness (a light emission amount) can be independently (individually) controlled. In the third embodiment, the backlight 8051 includes m×n backlight control regions consisting of m backlight control regions in the lateral direction (the horizontal direction) and n backlight control regions in the longitudinal direction (the vertical direction) (m and n are integers). Light emission brightnesses of the backlight control regions of the backlight 8051 are controlled by the control circuit 8052 according to light emission brightnesses acquired from the light emission brightness correcting unit 804.

The image correcting unit 806 is configured by the pixel value adjusting unit 807 and the smoothing processing unit 808. The image correcting unit 806 applies correction of a pixel value to image data output from the image input unit 801 and outputs the image data after the correction to the display panel unit 809.

The pixel value adjusting unit 807 acquires the light emission brightnesses after the correction from the light emission brightness correcting unit 804 and adjusts pixel values of the input image data according to the light emission brightnesses.

The smoothing processing unit 808 performs smoothing processing for reducing a sudden display brightness difference that occurs between the backlight control regions.

Specific processing by the pixel value adjusting unit 807 and the smoothing processing unit 808 is the same as the processing contents of the pixel value adjusting unit 107 and the smoothing processing unit 108 in the first embodiment.

The display panel unit 809 displays an image based on the image data output from the image correcting unit 806.

The display information managing unit 810 manages, as display information, various kinds of information stored by the display 800. The display information is information peculiar to the display 800 set in the display 800. The display information adopts the data configuration shown in FIG. 2B.

The display information is transmitted to the image output apparatus 700 via the communication unit 813 when the display 800 is connected to the image output apparatus 700. In the third embodiment, the display information is set in the displays by a user or the like in advance. When the display 800 configures the multi-screen display system, the display information managing unit 810 may manages, as the display information, a multi-screen display system name and arrangement information of the displays configuring the multi-screen display system.

The adjacent region information generating unit 811 generates adjacent region information in which adjacent regions, which are backlight control regions adjacent to boundary portions with other displays, and light emission brightnesses of the adjacent regions are associated with each other. In the third embodiment, the adjacent region information generating unit 811 acquires display information from the display information managing unit 810. The adjacent region information generating unit 811 specifies, as the adjacent regions, the backlight control regions adjacent to the boundary portion with the other display 900 configuring the multi-screen display system among the backlight control regions of the display 800. Further, the adjacent region information generating unit 811 acquires light emission brightness of each of the backlight control regions from the light emission brightness determining unit 803 and generates adjacent region information in which position information of the adjacent regions and light emission brightnesses of the adjacent regions are associated with each other. The adjacent region information is generated for each of image data of one frame to be output. Similarly, in the display 900, adjacent region information is generated for each of image data of one frame to be output.

The smoothing correction coefficient setting unit 812 sets, in the smoothing processing unit 808, information concerning a smoothing correction coefficient input from the outside of the display via the communication unit 813. In the third embodiment, the smoothing correction coefficient determining unit 704 included in the image output apparatus 700 determines a smoothing correction coefficient used in common in the multi-screen display system. When information concerning the smoothing correction coefficient is input to the display 800, the smoothing correction coefficient setting unit 812 sets the input smoothing correction coefficient as a smoothing correction coefficient used in the smoothing processing unit 808.

The communication unit 813 is connected to the communication unit 706 included in the image output apparatus 700. The communication unit 813 performs transmission of the display information and the adjacent region information and reception of the information concerning the corrected light emission brightness of each of the control regions, and the information concerning the smoothing correction coefficient used in common in the multi-screen display system.

Specific processing for building the multi-screen display system is explained with reference to FIGS. 11 to 13.

Figure 12:
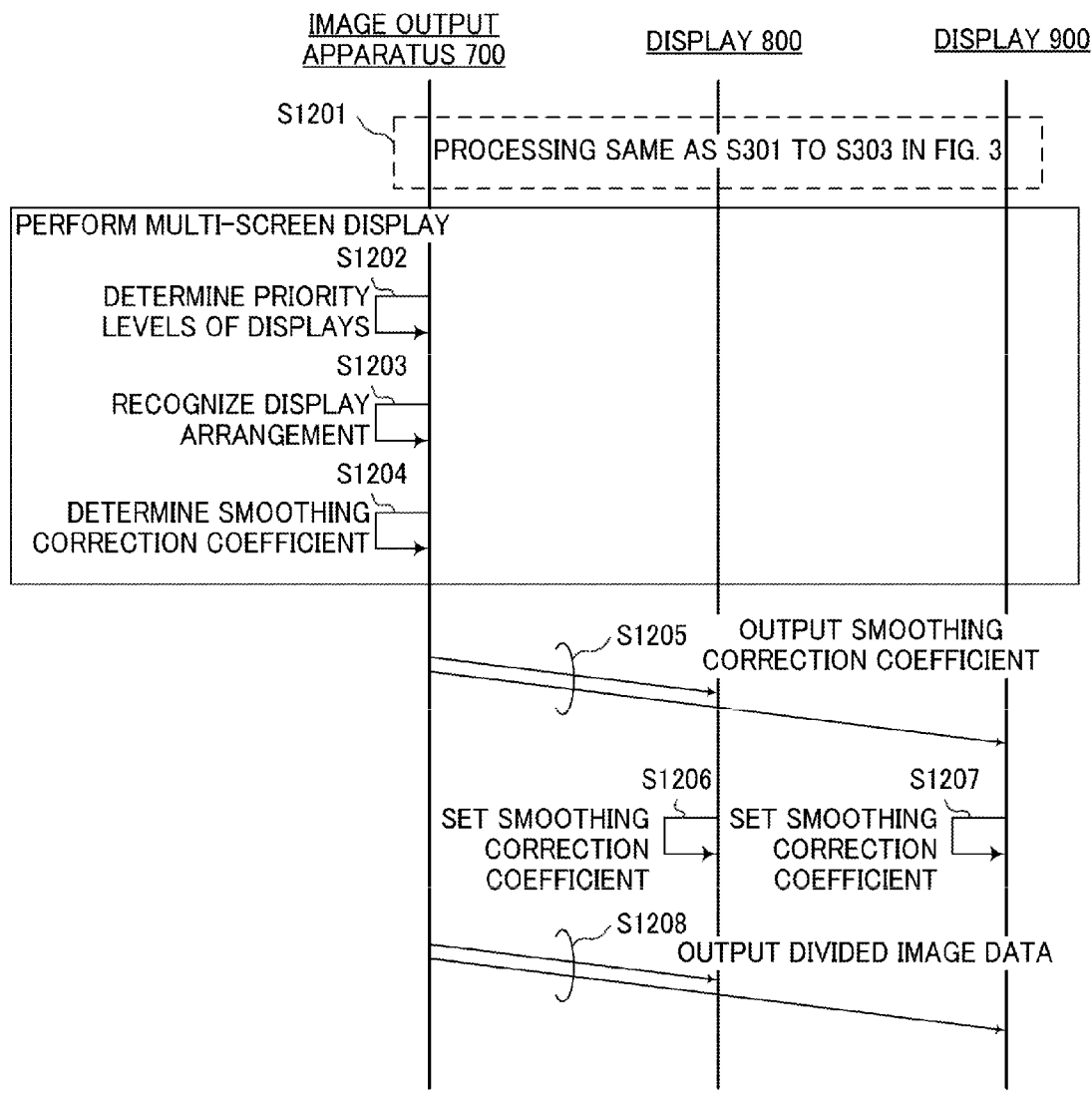
FIG. 12 is a flowchart for explaining initial setting necessary for building a multi-screen display system in the third embodiment.
Figure 13:
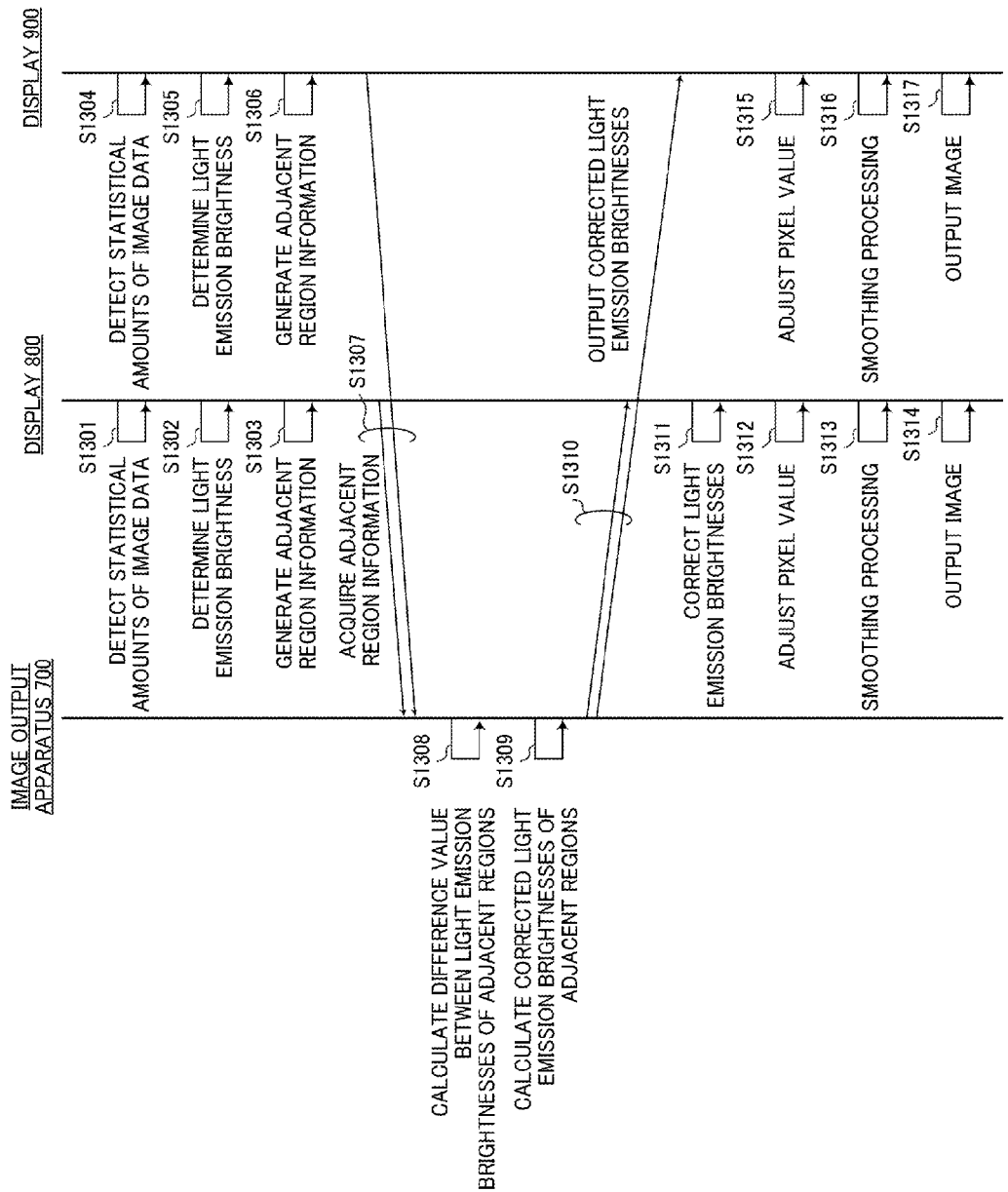
FIG. 13 is a flowchart for explaining processing for setting light emission brightnesses near a display boundary to coincide with each other in the third embodiment.

FIG. 12 is a flowchart for explaining initial setting processing executed by the image output apparatus 700 in building the multi-screen display system using the display 800 and the display 900. This processing is executed when the display 800 and the display 900 are connected to the image output apparatus 700.

First, when the display 800 and the display 900 are connected to the image output apparatus 700, the multi-screen control unit 703 of the image output apparatus 700 performs processing same as S301 to S303 of FIG. 3 in the first embodiment and determines whether the multi-screen display is performed (S1201).

Also in the third embodiment, the multi-screen control unit 703 confirms that the multi-screen display system flag is "1" concerning the display information of the display 800 and the display 900 and performs the multi-screen display.

Subsequently, the image output apparatus 700 performs initial setting for realizing the multi-screen display.

First, the multi-screen control unit 703 determines priority levels between the displays configuring the multi-screen display system (S1202). In the third embodiment, the priority levels are set for the displays by user operation. The priority level of the display 900 is set higher than the priority level of the display 800.

Subsequently, the multi-screen control unit 703 recognizes an arrangement relation between the display 800 and the display 900 on the basis of configuration information and a display arrangement coordinate of the multi-screen display system (S1203).

The smoothing correction coefficient determining unit 704 determines a smoothing correction coefficient of the multi-screen processing system (S1204). Specifically, the smoothing correction coefficient determining unit 704 checks smoothing correction coefficient information of the displays acquired by the multi-screen control unit 703 and sets, as the smoothing correction coefficient of the multi-screen processing system, a smoothing correction coefficient of the display having the higher priority level (the display 900).

The smoothing correction coefficient determining unit 704 outputs the smoothing correction coefficient determined in S1204 to the display 800 and the display 900 via the communication unit 706 (S1205).

When the smoothing correction coefficient is input to the display 800 from the image output apparatus 700, the smoothing correction coefficient setting unit 812 sets the smoothing correction coefficient to the smoothing processing unit 808 (S1206). Similarly, in the display 900, a smoothing correction coefficient is set (S1207).

After the initial setting is carried out, the image output unit 702 acquires image data from the image generating unit 701, generates, on the basis of the display arrangement recognized in S1203, image data of an image to be displayed on the displays, and outputs the generated image data to the displays (S1208).

The initial setting for realizing the multi-screen display in the third embodiment is as explained above.

A processing flow executed by the image output apparatus 700 in order to suppress a brightness difference that occurs in the boundary between the display 800 and the display 900 is explained with reference to FIG. 13. This processing is executed for each one frame of image data to be output.

In the display 800, when image data is input from the image output apparatus 700, the characteristic value detecting unit 802 detects a brightness histogram as a characteristic value of the image data (S1301).

Subsequently, the light emission brightness determining unit 803 acquires the brightness histogram detected by the characteristic value detecting unit 802 and determines, for each of the backlight control regions, light emission brightness of the backlight 8051 on the basis of the brightness histogram (S1302).

The adjacent region information generating unit 811 generates adjacent region information of the display 800 (S1303). In the third embodiment, the adjacent region information is information in which a plurality of backlight control regions adjacent to the boundary with the display 900 among the backlight control regions of the display 800 and light emission brightnesses of the respective backlight control regions are associated with each other.

Concerning the display 900, processing same as S1301 to S1303 is performed (S1304 to S1306).

The adjacent region information generated by the display 800 and the display 900 is output to the image output apparatus 700 via the communication units of the displays (S1307).

The image output apparatus 700 calculates a correction amount of the light emission brightnesses of the adjacent regions.

First, the adjacent light emission brightness calculating unit 705 acquires the adjacent region information of the display 800 and the display 900 from the displays. Further, the adjacent light emission brightness calculating unit 705 acquires display arrangement information from the multi-screen control unit 703 and calculates, for each of the adjacent regions, a difference value between light emission brightnesses of the adjacent regions of the display 800 and light emission brightnesses of the adjacent regions of the display 900 adjacent to the respective adjacent regions in the lateral direction (S1308).

Subsequently, when the difference value calculated in S1308 is larger than a predetermined threshold, the adjacent light emission brightness calculating unit 705 calculates corrected light emission brightnesses used for correction of the light emission brightnesses of the adjacent regions (S1309).

Figure 14:
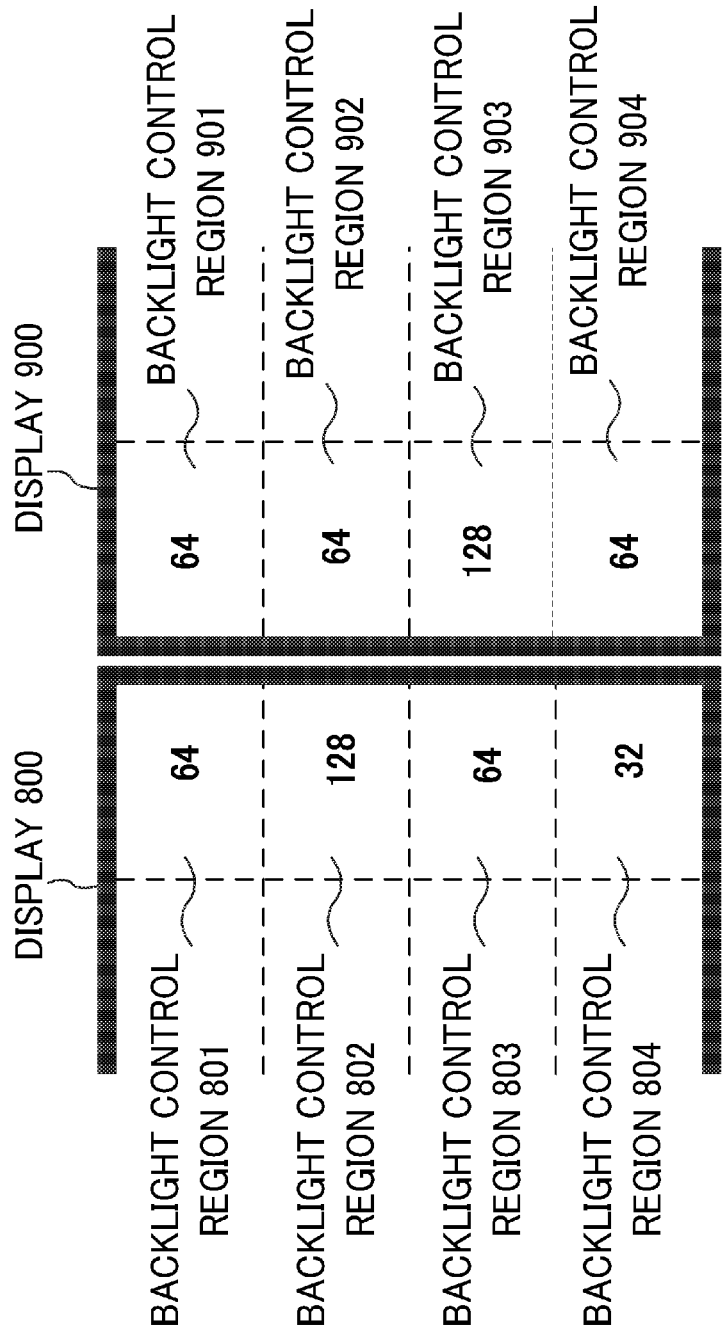
FIG. 14 is a diagram showing light emission brightness of each of backlight control regions of the display in the third embodiment.

A calculation method for corrected light emission brightnesses is explained in detail with reference to FIG. 14.

Light emission brightnesses of the backlight control regions 801, 802, 803, and 804 of the display 800 are respectively determined as 64, 128, 64, and 32 on the basis of statistical values (a brightness histogram) of image data in S1302. Light emission brightnesses of the backlight control regions 901, 902, 903, and 904 of the display 900 are respectively determined as 64, 64, 128, and 64 on the basis of statistical values (a brightness histogram) of image data in S1305.

In the third embodiment, a correction value for setting the light emission brightnesses of the adjacent regions of the display 800 to the same values as the light emission brightnesses of the adjacent regions of the display 900 having the high priority level is calculated on the basis of the priority levels determined in S1202. However, adjacent regions of the display 800 to be calculation targets of corrected light emission brightnesses is limited to adjacent regions in which an absolute value of a difference value between light emission brightnesses of adjacent regions adjacent to each other of the displays calculated in the processing in S1308 is larger than a threshold set in advance. When the threshold of the absolute value of the difference between the light emission brightnesses is set to 16, in FIG. 14, the backlight control regions 802, 803, and 804 of the display 800 are the adjacent regions to be the calculation targets of the corrected light emission brightnesses. In an example shown in FIG. 14, the corrected light emission brightnesss for the backlight control regions 802, 803, and 804 are 64, 128, and 64, which are light emission brightnesses of the backlight control regions 902, 903, and 904 of the display 900 adjacent to the display 800 across the display boundary. It is also possible to, without setting the priority levels for the displays, compare light emission brightnesses between the adjacent regions and adjust the lower light emission brightness to the higher light emission brightness. Alternatively, it is also possible to compare light emission brightness between the adjacent regions and adjust the higher light emission brightness to the lower light emission brightness.

The adjacent light emission brightness calculating unit 705 associates information concerning the calculated corrected light emission brightnesses with the backlight control regions corresponding to the corrected light emission brightnesses and outputs the information to the display 800. The adjacent light emission brightness calculating unit 705 outputs information concerning uncorrected light emission brightnesses of the adjacent regions to the display 900 (S1310).

The light emission brightness correcting unit 804 of the display 800 acquires the adjacent regions to be the correction targets and the corrected light emission brightnesses of the adjacent regions from the image output apparatus 700 and overwrites the light emission brightnesses of the adjacent regions determined by the light emission brightness determining unit 803 with the acquired corrected light emission brightnesses (S1311).

Thereafter, the pixel value adjusting unit 807 adjusts a pixel value of the input image data according to the light emission brightnesses after the correction acquired from the light emission brightness correcting unit 804 (S1312). Further, the smoothing processing unit 808 performs smoothing processing (S1313). The display panel unit 809 displays an image based on the image data after the smoothing processing (S1314).

In the display 900, processing same as S1312 to S1314 is performed (S1315 to S1317). However, in this example, since the adjacent regions of the display 900 are not correction targets, the light emission brightness correcting unit of the display 900 does not perform correction for the light emission brightness of each of the backlight control regions determined by the light emission brightness determining unit.

According to the processing explained above, when the multi-screen display system is configured using the displays that carry out the determination of light emission brightnesses and the pixel value correction for image data, it is possible to reduce a difference between the light emission brightnesses in the boundary portion between the displays.

Fourth Embodiment

In the first to third embodiments, the image output apparatus includes the multi-screen control unit. In the method explained in the first to third embodiments, the image output apparatus calculates correction values of light emission brightnesses of the backlight control regions (the adjacent regions) adjacent to the display boundary and suppresses discontinuity of display brightness.

In a fourth embodiment, when a multi-screen display system is configured using displays including a multi-screen control unit, a method of suppressing discontinuity of display brightness in a display boundary is explained. Specifically, an image output apparatus of the multi-screen display system in the fourth embodiment does not perform control for building the multi-screen display system. Multi-screen control units of the displays calculate a correction value of light emission brightnesses of adjacent regions in a display boundary. A determining method for light emission brightnesses in the fourth embodiment is explained in detail below.

Figure 15:
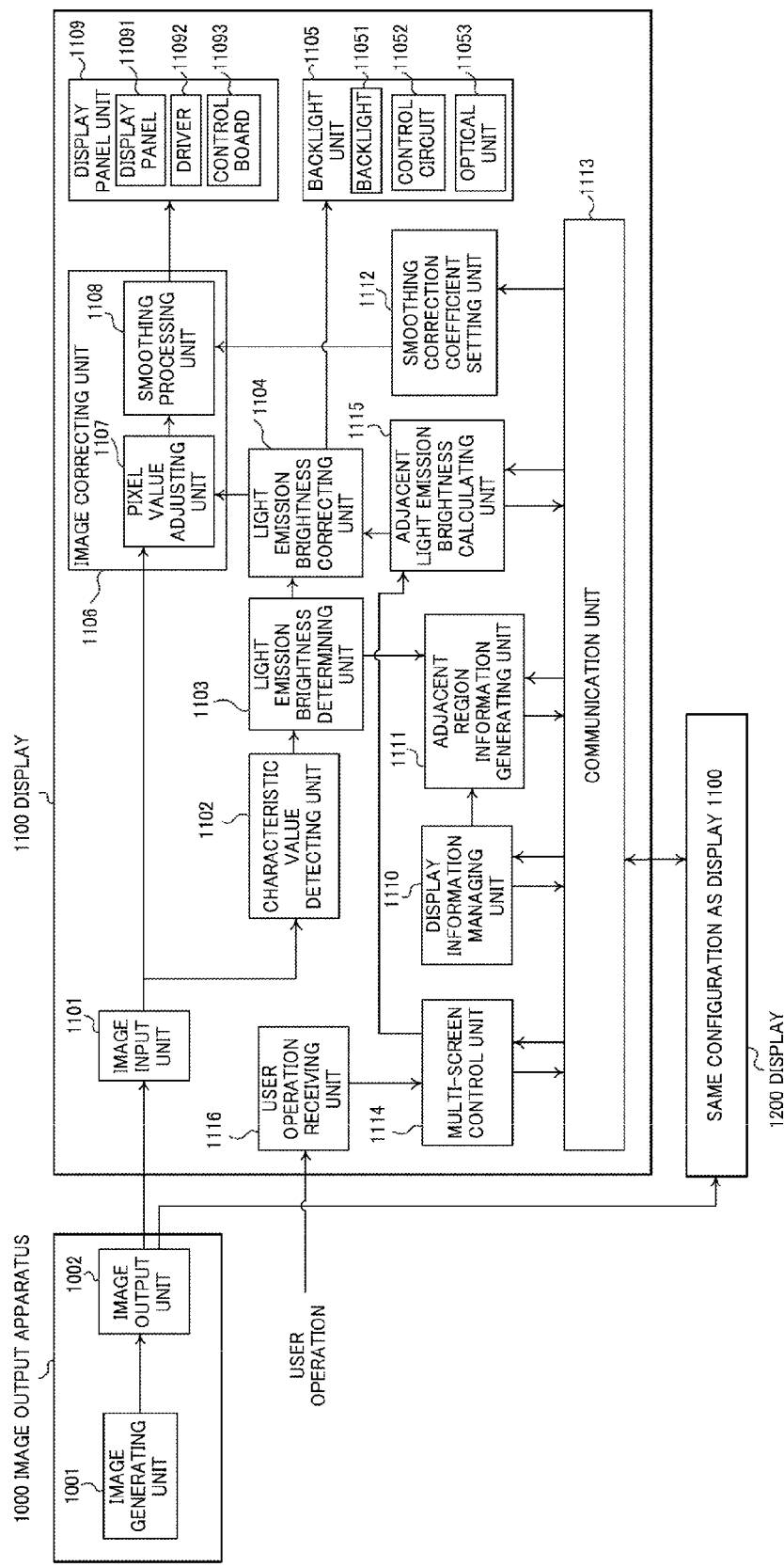
FIG. 15 is a block diagram showing the schematic configuration of a display in a fourth embodiment.

In the fourth embodiment, as shown in FIG. 15, the multi-screen display system is built using an image output apparatus 1000, a display 1100, and a display 1200. As in the first embodiment, as shown in FIG. 2A, the two displays are arranged on the left and right. The display 1100 is arranged on the left and the display 1200 is arranged on the right. As in the first embodiment, display information in the fourth embodiment adopts the data configuration shown in FIG. 2B. It is assumed that screen sizes, resolutions, the numbers of divisions of the backlight control regions, and division sizes of the backlight control regions of the displays coincide with each other between the displays.

FIG. 15 is a block diagram showing the schematic configuration of the image output apparatus 1000 and the display 1100 according to the present invention. The display 1200 has a configuration same as the configuration of the display 1100.

The image output apparatus 1000 includes an image generating unit 1001 and an image output unit 1002.

The image generating unit 1001 outputs image data of an image to be displayed in the multi-screen display system. The image data is configured by a plurality of frames. In the fourth embodiment, the image generating unit 1001 reads out image data from a storage device (not shown in the figure) included in the inside of the image output apparatus 1000. The image generating unit 1001 may acquire the image data from the outside of the image output apparatus 1000 via wired or radio communication means or may acquire the image data from an external recording medium such as an optical disk or a nonvolatile memory.

The image output unit 1002 generates (slices) image data of regions to be displayed on the displays from the image data and outputs the image data to the displays.

In the display 1100 shown in FIG. 15, blocks 1101 to 1112 have functions same as the functions of the blocks 801 to 812 in the third embodiment.

However, in the fourth embodiment, when a smoothing correction coefficient is input from the outside of the display, a smoothing correction coefficient determining unit 1112 sets the input smoothing correction coefficient as a smoothing correction coefficient used in the display 1100.

A communication unit 1113 is connected to a communication unit included in the display 1200 and performs transmission and reception of display information, adjacent region information, a correction value of light emission brightness of each of backlight control regions, a smoothing correction coefficient used in common in the displays configuring the multi-screen display system, and control information. The control information is information concerning various instructions and the like.

A multi-screen control unit 1114 determines a master display and a slave display among a plurality of displays configuring the multi-screen display system. The master display is a display configured to determine order and an instruction for transmitting and receiving various kinds of information in communication between the displays. The slave display is a display configuring the multi-screen display system in conjunction with the master display and configured to operate according to an instruction of the master display. In the fourth embodiment, the master display is the display 1100 and the slave display is the display 1200.

When the display 1100 is the master display, the multi-screen control unit 1114 registers, on the inside thereof, information concerning the slave display (the display 1200) connected to the display 1100 and acquires display information from the display 1200. The multi-screen control unit 1114 analyzes the acquired display information and recognizes the arrangement of the displays in performing the multi-screen display and the arrangement of the backlight control regions.

Further, the multi-screen control unit 1114 acquires adjacent region information from the display 1200 and outputs the adjacent region information to an adjacent light emission brightness calculating unit 1115 together with adjacent region information of the display 1100. When the display 1100 is the slave display, the multi-screen control unit 1114 performs, on the basis of a clock signal received from the master display, for example, processing for synchronizing a clock signal of the display 1100 with the master display.

Setting of a multi-screen mode by which whether the system operates as the multi-screen display system is determined can be switched by user operation from the outside of the display. In an example explained herein, the display 1100 is the master display and the display 1200 is the slave display. However, the displays are not limited to this. The display 1100 may be the slave display and the display 1200 may be the master display.

When the display is the master display, the adjacent light emission brightness calculating unit 1115 calculates, on the basis of adjacent region information of the master display and the slave display, corrected light emission brightnesses of the adjacent regions in the slave display. In the fourth embodiment, the adjacent region information is information in which the backlight control regions, which are adjacent regions, and light emission brightnesses of the adjacent regions are associated with each other. The multi-screen control unit 1114 outputs the adjacent region information acquired from the display 1200 to the adjacent light emission brightness calculating unit 1115.

The adjacent light emission brightness calculating unit 1115 calculates corrected light emission brightnesses on the basis of the adjacent region information of the display 1200 input from the multi-screen control unit 1114 and the adjacent region information of the display 1100 acquired from an adjacent region information generating unit 1111. The corrected light emission brightnesses are used as target values of correction in light emission brightness correction for the adjacent regions. The adjacent light emission brightness calculating unit 1115 associates the calculated corrected light emission brightnesses and the corresponding adjacent regions with each other and outputs the corrected light emission brightnesses and the adjacent regions to the slave display.

A user operation receiving unit 1116 receives user operation for instructing switching of setting to a multi-screen display system mode and outputs the instruction to the multi-screen control unit 1114. The user operation is executed using, for example, a remote controller.

Specific processing for building the multi-screen display system is explained below with reference to FIGS. 16 to 17.

Figure 16:
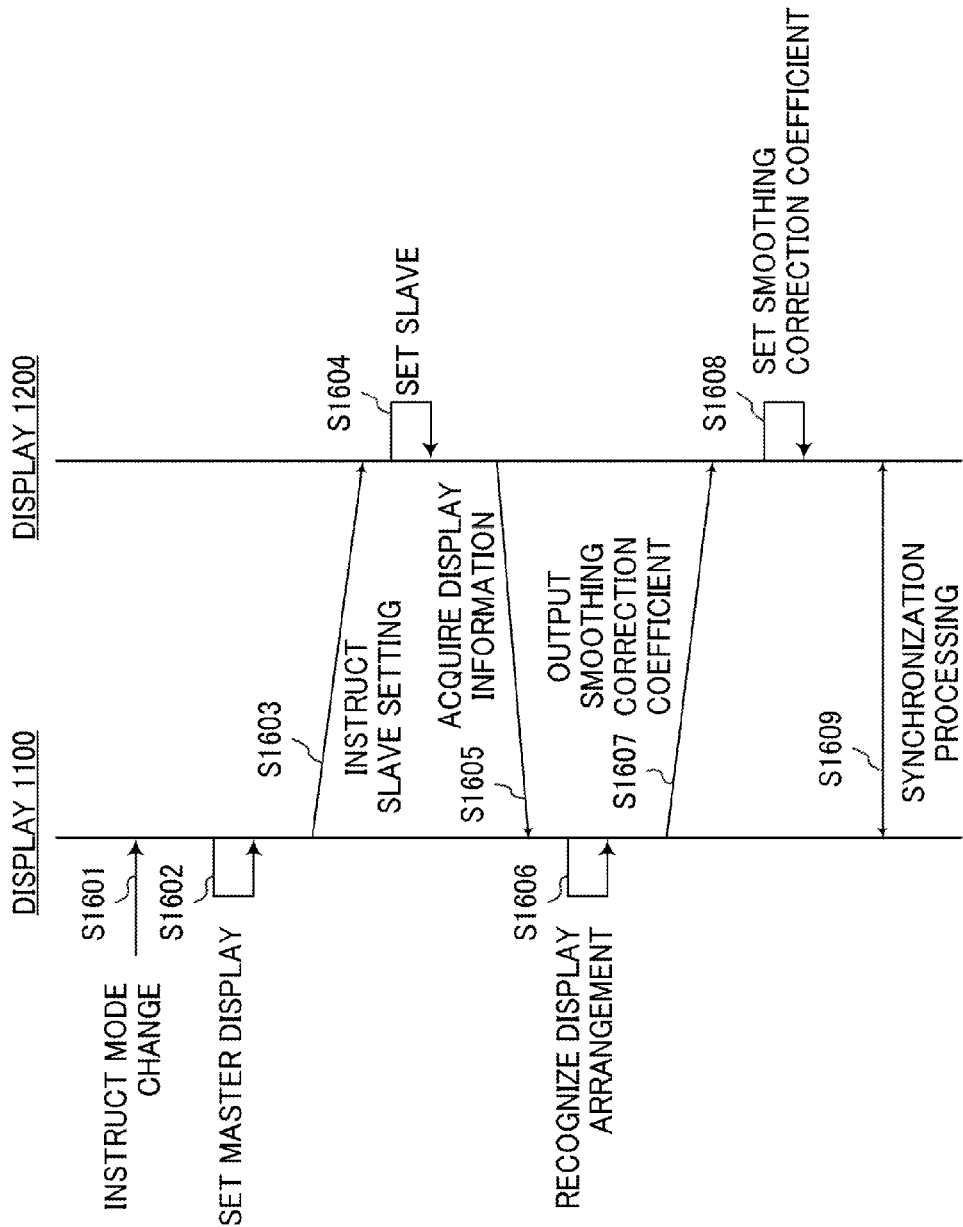
FIG. 16 is a flowchart for explaining initial setting necessary for building a multi-screen display system in the fourth embodiment.

FIG. 16 is a flowchart for explaining initial setting processing executed by the display 1100 in building the multi-screen display system in cooperation with the display 1200. This processing is executed when the display 1100 and the display 1200 are connected and switching of setting to the multi-screen display system mode is instructed from the user.

First, when the switching of setting from the multi-screen display system mode is instructed from the user (S1601), the multi-screen control unit 1114 of the display 1100 sets the display 1100 as the master display (S1602).

In an example explained herein, the display that receives the instruction for switching of setting to the multi-screen display system mode is set as the master display. However, the master display is not limited to this. It is also possible that information indicating priority levels between the displays such as a master and a slave is described in advance in the display information retained on the inside by the displays and the master display is set with reference to the information. The user may be able to individually set the master or the slave of the displays according to a user instruction separate from the instruction for switching of setting to the multi-screen display system mode.

The multi-screen control unit 1114 of the display 1100, which is the master display, instructs the display connected to the display 1100 to be the slave display (S1603). According to the instruction, a multi-screen control unit (not shown in the figure) of the display 1200 sets the display 1200 as the slave display (S1604).

Subsequently, the multi-screen control unit 1114 of the display 1100 acquires display information of the display 1200 (S1605).

The multi-screen control unit 1114 of the display 1100 acquires system configuration information and a display arrangement coordinate on the basis of the display information acquired from the display 1200 and the display information of the display 1100. The multi-screen control unit 1114 of the display 1100 recognizes, on the basis of the acquired information, an arrangement relation between the display 1100 and the display 1200 (S1606).

The multi-screen control unit 1114 of the display 1100 outputs a smoothing correction coefficient of the display 1100, which is the master display, to the display 1200 (S1607). A smoothing correction coefficient determining unit (not shown in the figure) of the display 1200 sets the smoothing correction coefficient input from the outside of the display in a smoothing processing unit (not shown in the figure) of the display 1200 (S1608).

According to the setting explained above, the display 1100 and the display 1200 complete preparation for operating as the multi-screen display system. When the image output apparatus 1000 outputs image data to the displays in this state, image display by the multi-screen display system is performed. Specifically, the image output unit 1002 of the image output apparatus 1000 acquires image data from the image generating unit 1001 and outputs the image data to the displays 1100 and 1200.

An image input unit 1101 of the display 1100, which is the master display, generates (slices), on the basis of the display arrangement recognized in S1603, image data of a region to be displayed on the display 1100 from image data input from the image output apparatus 1000.

The display 1200, which is the slave display, acquires display arrangement information from the display 1100, which is the master display, via a communication unit (not shown in the figure). An image input unit (not shown in the figure) of the display 1200 generates (slices), on the basis of the display arrangement information, image data of a region to be displayed on the display 1200 from image data input from the image output apparatus 1000.

It is also possible that, as in the first to third embodiments, a communication unit configured to communicate with the displays 1100 and 1200 is provided in the image output apparatus 1000 and the image output apparatus 1000 acquires display arrangement information from the master display (the display 1100). In this case, as in the first to third embodiments, the image output unit 1002 of the image output apparatus 1000 divides, on the basis of the acquired display arrangement information, image data input from the image generating unit 1001 into images in display ranges on the displays. The image output unit 1002 may output image data obtained by the division to the displays.

The display 1200, which is the slave display, receives a clock signal from the display 1100, which is the master display, and performs synchronization processing between the displays (S1609).

The initial setting processing in building the multi-screen display system in the fourth embodiment is as explained above.

A processing flow for suppressing a brightness difference that occurs in a boundary between the display 1100 and the display 1200 is explained with reference to FIG. 17. In this processing, the display 1100 transmits information concerning light emission brightness of a backlight 11051 of the display 1100 to the display 1200 and performs light emission brightness correction to suppress the brightness difference in the boundary between the displays. This processing is executed for each one frame of image data to be output.

In the display 1100, when image data is input from the image output apparatus 1000, the characteristic value detecting unit 1102 detects a brightness histogram, which is a characteristic value of the image data, for each of the backlight control regions (each of divided regions) in the display 1100 (S1701).

Subsequently, a light emission brightness determining unit 1103 acquires the brightness histogram detected by the characteristic value detecting unit 1102 and determines, on the basis of the brightness histogram, for each of the backlight control regions, light emission brightness of the backlight 11051 in the display 1100 (S1702).

In the display 1200, processing same as S1701 to S1702 is performed. That is, a characteristic value detecting unit of the display 1200 detects a brightness histogram, which is a characteristic value of image data, for each of the backlight control regions in the display 1200 (S1703). A light emission brightness determining unit of the display 1200 acquires the brightness histogram detected by the characteristic value detecting unit and determines, on the basis of the brightness histogram, light emission brightness of the backlight in each of the backlight control regions in the display 1200 (S1704). In this way, in S1703 to S1704, light emission brightness of each of the backlight control regions of the display 1200 corresponding to input image data is calculated.

The multi-screen control unit 1114 outputs, via the communication unit 1113, information indicating the positions of the backlight control regions (the adjacent regions) adjacent to the boundary with the display 1100 in the display 1200 to the display 1200. Further, the multi-screen control unit 1114 instructs the display 1200 to generate adjacent region information in the display 1200 (S1705). The adjacent region information of the display 1200 is information in which position information of backlight control regions (adjacent regions of the display 1200) adjacent to the display 1100 and a value of light emission brightness set for each of the backlight control regions are associated with each other.

In the fourth embodiment, in later light emission brightness correction processing, information concerning the adjacent regions of the slave display and light emission brightnesses associated with the respective adjacent regions needs to be aggregated in the master display. The display 1100, which is the master display, recognizes arrangement information of the displays. That is, the display 1200 does not include information concerning which of the backlight control regions of the display 1200 are backlight control regions (adjacent regions) adjacent to the display 1100. Therefore, in order to acquire information concerning light emission brightnesses of the adjacent regions of the display 1200 from the display 1200, the display 1100 gives information indicating the positions of the adjacent regions of the display 1200 to the display 1200 and requests light emission brightness information of the adjacent regions.

An adjacent region information generating unit (not shown in the figure) of the display 1200, which receives adjacent region information and a light emission brightness information request, generates adjacent region information in which backlight control regions designated as adjacent regions and light emission brightnesses of the respective backlight control regions are associated with each other (S1706). The adjacent region information generated in the display 1200 is transmitted to the display 1100 via a communication unit of the display 1200 (S1708).

The multi-screen control unit 1114 requests the display 1200 to transmit the adjacent region information and instructs the adjacent region information generating unit 1111 of the display 1100 to generate adjacent region information. The adjacent region information generating unit 1111 of the display 1100 acquires, from a display information managing unit 1110, display information concerning the display 1200 in the configuration of the multi-screen display system. Further, the adjacent region information generating unit 1111 generates adjacent region information in the display 1100 on the basis of the display information (S1707). The adjacent region information of the display 1100 is information in which position information of backlight control regions of the display 1100 (adjacent regions of the display 1100) adjacent to the display 1200 and a value of light emission brightness set for each of the backlight control regions are associated with each other.

The multi-screen control unit 1114 of the display 1100 acquires the adjacent region information from the display 1200 (S1708) and outputs the adjacent region information to the adjacent light emission brightness calculating unit 1115.

The adjacent light emission brightness calculating unit 1115 specifies, on the basis of the adjacent region information of the display 1100 and the adjacent region information of the display 1200, backlight control regions (light emission brightness correction target regions) that should be subjected to light emission brightness correction in the display 1100 and the display 1200. In the fourth embodiment, a configuration for performing light emission brightness correction for only the display 1200 is explained.

The adjacent light emission brightness calculating unit 1115 acquires the adjacent region information of the display 1100 from the adjacent region information generating unit 1111. Further, the adjacent light emission brightness calculating unit 1115 acquires the display arrangement information from the multi-screen control unit 1114. The adjacent light emission brightness calculating unit 1115 calculates, for each of the adjacent regions, a difference value between light emission brightnesses of the adjacent regions of the display 1100 and light emission brightnesses of the adjacent regions of the display 1200 adjacent to the adjacent regions in the lateral direction (S1709). The adjacent light emission brightness calculating unit 1115 compares an absolute value of the difference value with a predetermined threshold and determines, as light emission brightness correction target regions, regions where the absolute value of the difference value is larger than the predetermined threshold. The light emission brightnesses of the adjacent regions of the display 1200 are determined by the light emission brightness determining unit of the display 1200 on the basis of a characteristic value. The light emission brightnesses of the adjacent regions of the display 1100 are determined by the light emission brightness determining unit 1103 on the basis of a characteristic value.

Subsequently, when the absolute value of the difference value calculated in S1709 is larger than the predetermined threshold, the adjacent light emission brightness calculating unit 1115 calculates corrected light emission brightnesses for correcting the light emission brightnesses of the adjacent regions (S1710). A specific calculation method for the corrected light emission brightnesses is the same as the calculation method in the third embodiment. In the fourth embodiment, the corrected light emission brightnesses are calculated such that light emission brightnesses of adjacent regions of the light emission brightness correction targets of the slave display 1200 are the same values as light emission brightnesses of adjacent regions of the master display 1100 adjacent to the regions of the light emission brightness correction targets in the lateral direction. That is, the corrected light emission brightnesses are calculated as target values for correction for changing light emission brightness of the display 1200.

In the fourth embodiment, the corrected light emission brightnesses of the adjacent regions of the display 1200 are set to be the same values as the light emission brightnesses of the adjacent regions of the display 1100 adjacent to the regions of the display 1200 in the lateral direction. However, the corrected light emission brightnesses are not limited to this. The corrected light emission brightnesses may be set such that the light emission brightnesses of the adjacent regions of the display 1100 and the light emission brightnesses of the adjacent regions of the display 1200 adjacent to the regions of the display 1100 in the lateral direction are close to each other. If discontinuity of an image between the displays is relaxed when light emission brightnesses of backlight control regions to be targets of the light emission brightness correction are close to light emission brightnesses of adjacent regions of the display adjacent to the backlight control regions in the lateral direction, the corrected light emission brightnesses may be any values.

The multi-screen control unit 1114 outputs the corrected light emission brightnesses calculated by the adjacent light emission brightness calculating unit 1115 to the display 1200 via the communication unit 1113 together with information concerning the corresponding adjacent regions (S1711). The corrected light emission brightnesses for the display 1200 are sent to the multi-screen control unit of the display 1200 via the communication unit 1113 and sent to an adjacent light emission brightness calculating unit of the display 1200. Information without correction is output to the light emission brightness correcting unit 1104 of the display 1100.

A light emission brightness correcting unit (not shown in the figure) of the display 1200 applies correction of light emission brightnesses to the backlight control regions specified as the light emission brightness correction target regions using the corrected light emission brightnesses transmitted to the adjacent light emission brightness calculating unit of the display 1200. That is, a light emission brightness correcting unit of the display 1200 overwrites the light emission brightnesses of the adjacent regions determined by the light emission brightness determining unit (not shown in the figure) with the corrected light emission brightnesses on the basis of the adjacent regions to be the correction targets acquired from the display 1100 and the corrected light emission brightnesses of the adjacent region (S1712).

In the display 1100, a pixel value adjusting unit 1107 adjusts a pixel value of input image data according to the light emission brightnesses of the backlight control regions after the correction acquired from the light emission brightness correcting unit 1104 (S1713). The display 1100 is the master display. Actually, correction of the light emission brightnesses of the backlight control regions is not performed. A smoothing processing unit 1108 performs smoothing processing (S1714) and displays, on a display panel unit 1109, an image based on the image data corrected by the pixel value adjusting unit 1107 on the basis of the light emission brightness of the backlight 11051 calculated in S1702 (S1715).

In the display 1200, processing same as S1713 to S1715 is performed (S1716 to S1718). That is, after the light emission brightness correction is completed in S1712, light emission of the backlight is controlled on the basis of the corrected light emission brightnesses. An image based on the image data corrected by the image correcting unit on the basis of the corrected light emission brightnesses is displayed on a display panel unit of the display 1200.

The light emission brightness for the backlight control regions in the fourth embodiment is specifically explained with reference to FIGS. 5A and 5B. In FIGS. 5A and 5B, the display 200 is read as the display 1100 and the display 300 is read as the display 1200.

A threshold of an absolute value of a difference value between adjacent regions used in determining whether the light emission brightness correction is executed is set to 16. In the processing in S1709, first, the adjacent light emission brightness calculating unit 1202 of the display 1100 determines whether a region where a light emission brightness correction condition is satisfied is present in the display 1200. In the fourth embodiment, in the backlight control region 301 of the display 1200, an absolute value of a difference value of the light emission brightnesses from the backlight control region 201 of the display 1100 is 64, which is larger than the threshold of 16. Therefore, only the backlight control region 301 of the display 1200 satisfies the light emission brightness condition. Therefore, in the fourth embodiment, the backlight control region 301 of the display 1200 is the light emission brightness correction target region.

The adjacent light emission brightness calculating unit 1115 receives the adjacent region information of the display 1100 from the adjacent region information generating unit 1111 and receives the adjacent region information of the display 1200 from an adjacent region information generating unit of the display 1200 via the communication unit 1113. The adjacent light emission brightness calculating unit 1115 determines corrected light emission brightness of the light emission brightness correction target region on the basis of information concerning the specified light emission brightness correction target region and the adjacent region information of the displays. Specifically, the adjacent light emission brightness calculating unit 1115 determines, as correction target light brightness of the backlight control region 301 of the display 1200, the light emission brightness (128) of the backlight control region 201 to which the backlight control region 301 of the display 1200 is adjacent in the lateral direction.

The adjacent light emission brightness calculating unit 1115 outputs the determined corrected light emission brightness to the adjacent light emission brightness calculating unit of the display 1200 via the communication unit 1113. The light emission brightness correcting unit of the display 1200 corrects light emission brightnesses of the backlight control region on the basis of the corrected light emission brightness. Specifically, the adjacent light emission brightness calculating unit 1115 overwrites the light emission brightness (64) calculated by the light emission brightness determining unit of the display 1200 with the corrected light emission brightness (128). An image correcting unit of the display 1200 applies correction to image data on the basis of the corrected light emission brightness transmitted from the light emission brightness correcting unit.

According to the processing explained above, when the multi-screen display system is built using a plurality of displays including multi-screen control units, it is possible to set light emission brightnesses in a boundary portion between the displays close to each other and reduce a brightness difference. (In the fourth embodiment, it is possible to eliminate the brightness difference). As a result, in the multi-screen display system, it is possible to suppress discontinuity of brightness in the boundary portion between the displays and perform the multi-screen display at high image quality.

Another example of the multi-screen display system

In the fourth embodiment, the present invention is applied to the multi-screen display system configured using the displays including the multi-screen control units. However, a multi-screen display system applicable with the present invention is not limited to the configuration explained above.

Another example of the specific processing for building the multi-screen display system applicable with the present invention using displays including the local dimming control function is explained with reference to FIGS. 18 and 19.

Figure 18:
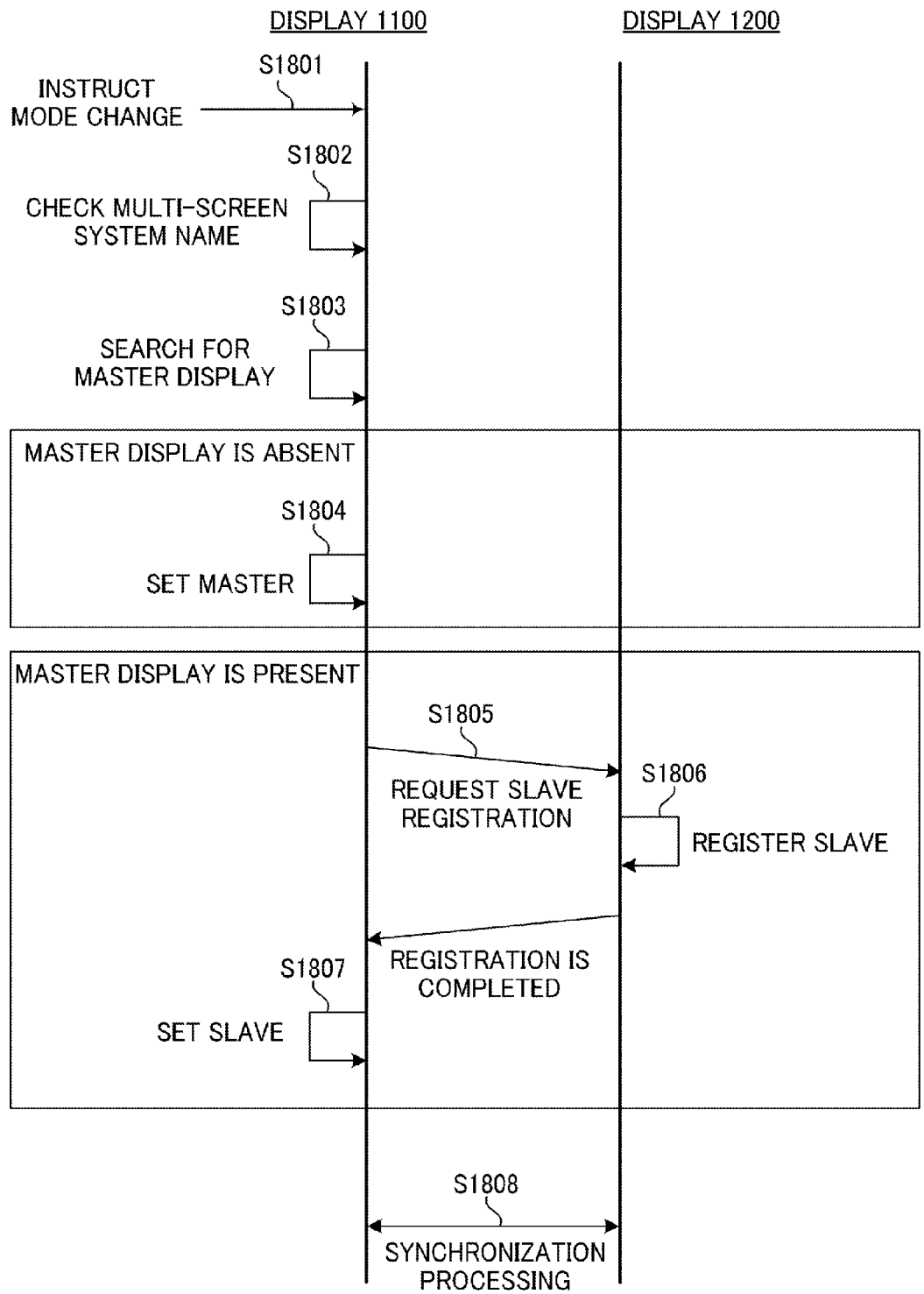
FIG. 18 is a flowchart for explaining processing for building the multi-screen display system in the fourth embodiment.

FIG. 18 is a flowchart for explaining a processing flow in which the display 1100 configures the multi-screen display system in cooperation with the display 1200. The user instructs switching of mode setting of the display 1100 to a mode of the multi-screen display system configured by the display 1100 and the display 1200 via the user operation receiving unit 1116 (S1801). Then, the multi-screen control unit 1114 acquires a multi-screen display system name from the display information managing unit 1110.

After checking the acquired multi-screen display system name (S1802), the multi-screen control unit 1114 searches for, via the communication unit 1113, a display having the same multi-screen display system name out of displays connected to a network. When the multi-screen control unit 1114 found the display having the same multi-screen display system name (the display 1200) as a result of the search, the multi-screen control unit 1114 checks whether the display is the master display (S1803). On the other hand, when the display having the same screen display system name is absent or, even if the display having the same screen display system name is present, the display is not the master display, the multi-screen control unit 1114 sets the display 1100 as the master display (S1804).

On the other hand, when the display 1200 is the master display, the multi-screen control unit 1114 transmits display information of the display 1100 to the display 1200 and requests the display 1200 to register the display 1100 as the slave display (S1805). When the display 1200 completes the registration (S1806), the display 1100 sets the display 1100 itself as the slave display (S1807). The display 1100, which is the slave display, receives a clock signal from the display 1200, which is the master display, and performs synchronization processing between the displays (S1808).

In the example explained above, one display performs processing for setting the display as the master display or as the slave display on the basis of information concerning whether the other display is the master display. However, the processing is not limited to this, the displays may be set in advance whether the displays are the master display or the slave display. In the example, the user performs the setting of the master display and the slave display during the mode setting switching operation to the multi-screen display system modes. However, the setting of the master display and the slave display is not limited to this. When the display is started, the user may perform the setting of the master display and the slave display in the displays on the basis of the mode setting information stored in advance.

Figure 19:
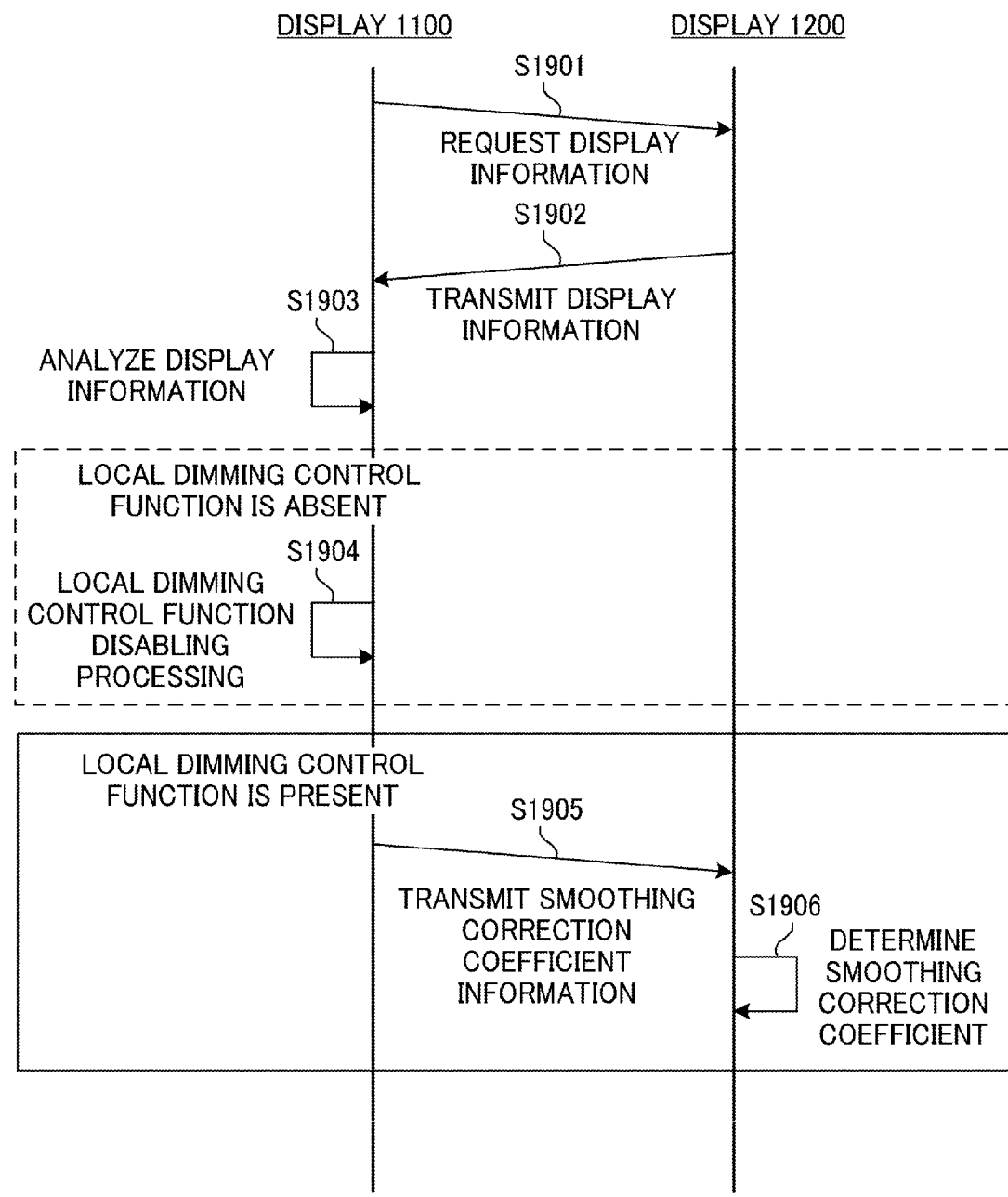
FIG. 19 is a flowchart for explaining the processing for building the multi-screen display system in the fourth embodiment.

FIG. 19 is a flowchart for explaining a processing flow for transmitting and receiving display information between the displays configuring the multi-screen display system. The multi-screen control unit 1114 of the display 1100, which is the master display, requests the display 1200, which is the slave display, to transmit the display information of the display 1200 (S1901). The multi-screen control unit of the display 1200 acquires the display information of the display 1200 from the display information managing unit 1110 of the display 1200 and transmits the display information to the display 1100 via the communication unit (S1902).

The multi-screen control unit 1114 of the display 1100 analyzes the received display information of the display 1200 (S1903). Specifically, the multi-screen control unit 1114 compares various kinds of information included in the display information of the display 1200 between the displays. The various kinds of information are, for example, screen sizes, black level values, presence or absence of mounting of the local dimming control function, the numbers of divisions of backlight control regions, sizes of the backlight control regions, and arrangement configurations of the backlight control regions. When the display 1200 does not include the local dimming control function, a backlight unit 1105 of the display 1100 sets the local dimming control function as disabled. In other words, a control circuit 11052 of the backlight unit 1105 controls light emission brightnesses of light sources of the backlight 11051 to be substantially the same (S1904).

When the display 1200 includes the local dimming control function, the multi-screen control unit 1114 acquires, from the display information managing unit 1110, smoothing correction coefficient information calculated in processing explained below and transmits the smoothing correction coefficient information to the display 1200. The multi-screen control unit 1114 instructs the display 1200 to determine a smoothing correction coefficient as a correction coefficient used for smoothing processing (S1905). The multi-screen control unit of the display 1200 transmits the received smoothing correction coefficient information to a smoothing correction coefficient setting unit of the display 1200. The smoothing correction coefficient setting unit of the display 1200 outputs the received smoothing correction coefficient to the smoothing processing unit of the display 1200 (S1906). In other words, in S1906, the smoothing correction coefficient of the display 1200 is determined.

In the configuration explained above, the display 1100 transmits the smoothing correction coefficient information to the display 1200 and the display 1200 determines the smoothing correction coefficient on the basis of the smoothing correction coefficient information. However, a configuration for determining the smoothing correction coefficient is not limited to this. For example, the display 1200 may receive display information of the display 1100 and calculate the smoothing correction coefficient of the display 1200 by itself on the basis of the display information.

In the analysis in S1903, it is determined that the display 1100 and the display 1200 include the local dimming control function. However, display specifications sometimes do not coincide with each other between displays. For example, black level values, screen sizes, the numbers of divisions of backlight control regions, sizes of the backlight control regions, and arrangement configurations of the backlight control regions, and the like sometimes do not coincide with each other between the displays. In such a case, backlight control for disabling the local dimming control function of the displays may be executed.

In the fourth embodiment, in the display, the user operates the setting method for the master display in the multi-screen display system. However, the setting method may be set in the displays in advance. In the example of the processing explained in the fourth embodiment, the master display (in the fourth embodiment, the display 1100) calculates the corrected light emission brightness used in the light emission brightness correction of the slave display. However, the calculation of the corrected light emission brightness is not limited to this. For example, the slave display may calculate the corrected light emission brightness applied to the master display and perform control to apply the light emission brightness correction to the master display. In the fourth embodiment, the correction is performed to increase the light emission brightness of the light emission brightness correction target region. However, the correction is not limited to this. For example, the light emission brightness correction may be performed to set light emission brightness of a region having high light emission brightness close to light emission brightness of a region having low light emission brightness.

Fifth Embodiment

In the explanation in the fourth embodiment, the division configurations (the numbers of divisions, the sizes of the divided regions, and the arrangement configurations of the divided regions) of the backlight control regions are the same between the displays configuring the multi-screen display system. In a fifth embodiment, a method of configuring a multi-screen display system using displays having the local dimming control function and having division configurations (the numbers of divisions, the sizes of divided regions, and arrangement configurations) of backlight control regions different from one another is explained with reference to FIGS. 20 to 23. The display 1100 and the display 1200 are the same except that only the division configurations of the backlight control regions are different.

Figure 20:
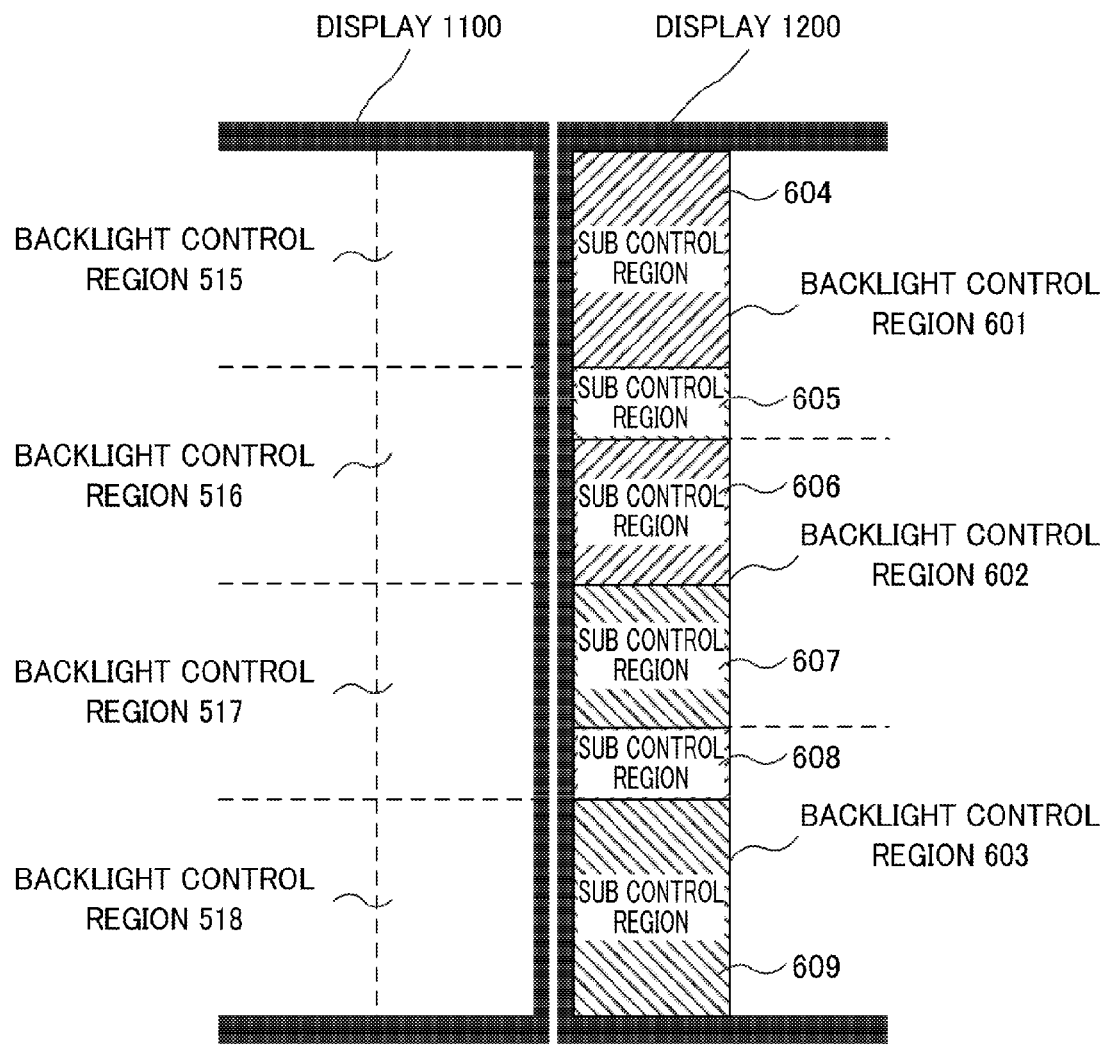
FIG. 20 is an explanatory diagram showing sub control regions in a fifth embodiment.

FIG. 20 is an explanatory diagram for explaining sub control regions explained below in the fifth embodiment. Each of backlight control regions 515 to 518 of the display 1100 is an adjacent region adjacent to the display 1200 in the display 1100. Each of backlight control regions 601 to 603 of the display 1200 is an adjacent region adjacent to the display 1100 in the display 1200.

In the fifth embodiment, the adjacent light emission brightness calculating unit 1115 divides backlight control regions adjacent to a boundary portion between displays into finer backlight control regions (referred to as sub control regions). In the fifth embodiment, the backlight control regions are configured by sets of a plurality of minimum control units. The backlight control regions configured in this way can be divided by finer backlight control regions. Each of the sub control regions is configured by one or a plurality of minimum control units.

The sub control regions are explained using the display 1200 shown in FIG. 20. As shown in the display 1200 in FIG. 20, sub control regions 604 to 609 are respectively obtained by dividing the backlight control regions 601 to 603 of the backlight 11051 into finer backlight control regions. A part of boundaries among the sub control regions are set to coincide with boundaries among the backlight control regions in adjacent regions of the display 1100 adjacent to the display 1200.

Specifically, as shown in FIG. 20, a boundary between the backlight control region 515 and the backlight control region 516 and a boundary between the sub control region 604 and the sub control region 605 coincide with each other in the lateral direction. The adjacent light emission brightness calculating unit of the display 1200 divides the backlight control region 601 into the sub control region 604 and the sub control region 605 to realize such a configuration.

As shown in FIG. 20, a boundary between the backlight control region 516 and the backlight control region 517 and a boundary between the sub control region 606 and the sub control region 607 coincide with each other in the lateral direction. The adjacent light emission brightness calculating unit of the display 1200 divides the backlight control region 602 into the sub control region 606 and the sub control region 607 to realize such a configuration.

As shown in FIG. 20, a boundary between the backlight control region 517 and the backlight control region 518 and a boundary between the sub control region 608 and the sub control region 609 coincide with each other in the lateral direction. The adjacent light emission brightness calculating unit of the display 1200 divides the backlight control region 603 into the sub control region 608 and the sub control region 609 to realize such a configuration.

The adjacent light emission brightness calculating unit 1115 further determines a target light emission brightness (corrected light emission brightness) for each of the sub control regions. The corrected light emission brightness is a target value of light emission brightness set in the sub control region. The adjacent light emission brightness calculating unit 1115 outputs the determined corrected light emission brightness to the light emission brightness correcting unit 1104 together with sub control region information (positions and sizes), which is information concerning the sub control regions, in the sub control regions.

The light emission brightness correcting unit 1104 overwrites a value of light emission brightness input from the light emission brightness determining unit 1103 with a value of the corrected light emission brightness input from the adjacent light emission brightness calculating unit 1115.

Figure 21:
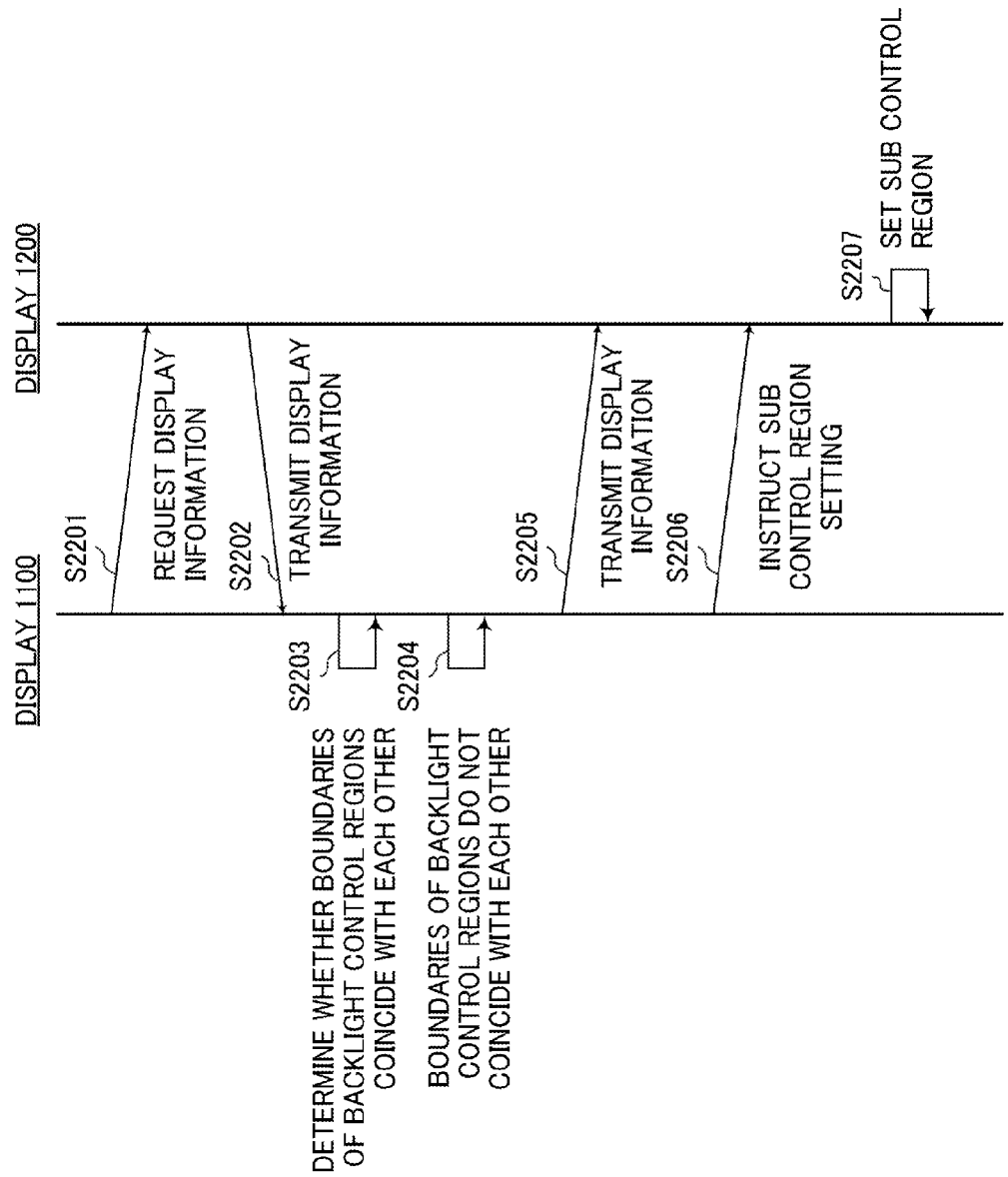
FIG. 21 is an explanatory diagram showing setting processing for the sub control regions in the fifth embodiment.

FIG. 21 is a diagram showing processing in which the multi-screen display system in the fifth embodiment sets sub control regions. A master display and a slave display in the multi-screen display system are determined by processing same as the processing shown in FIG. 18 in the fourth embodiment. Explanation of the master display and the slave display is omitted. In the explanation in the fifth embodiment, the display 1100 is the master display and the display 1200 is the slave display.

First, the multi-screen control unit 1114 of the display 1100 requests display information of the display 1200 (S2201). The display 1200 receives the request and transmits the display information to the display 1100 (S2202). The multi-screen control unit 1114 of the display 1100 determines, from the display information of the display 1100 and the display 1200, whether boundaries of backlight control regions coincide with each other between the displays (S2203). The display information includes screen sizes, the numbers of divisions of backlight control regions, sizes of the backlight control regions, and arrangement configurations of the backlight control regions.

When the boundaries of the backlight control regions do not coincide with each other (S2204), the display 1100 transmits the display information of the display 1100 to the display 1200 (S2205) and performs a setting instruction of sub control regions (S2206). When the boundaries of the backlight control regions coincide with each other, although not shown in the figure, the light emission brightness correction in the fourth embodiment is performed.

The multi-screen control unit of the display 1200 outputs the display information concerning the display 1100 received from the display 1100 to the adjacent light emission brightness calculating unit of the display 1200. The adjacent light emission brightness calculating unit of the display 1200 sets the sub control regions 604 to 609 shown in FIG. 20 on the basis of the input display information concerning the display 1100 (S2207). The display information used herein is the number of divisions of the backlight control regions of the display 1100, sizes of the backlight control regions, and an arrangement configuration of the backlight control regions.

Figure 22:
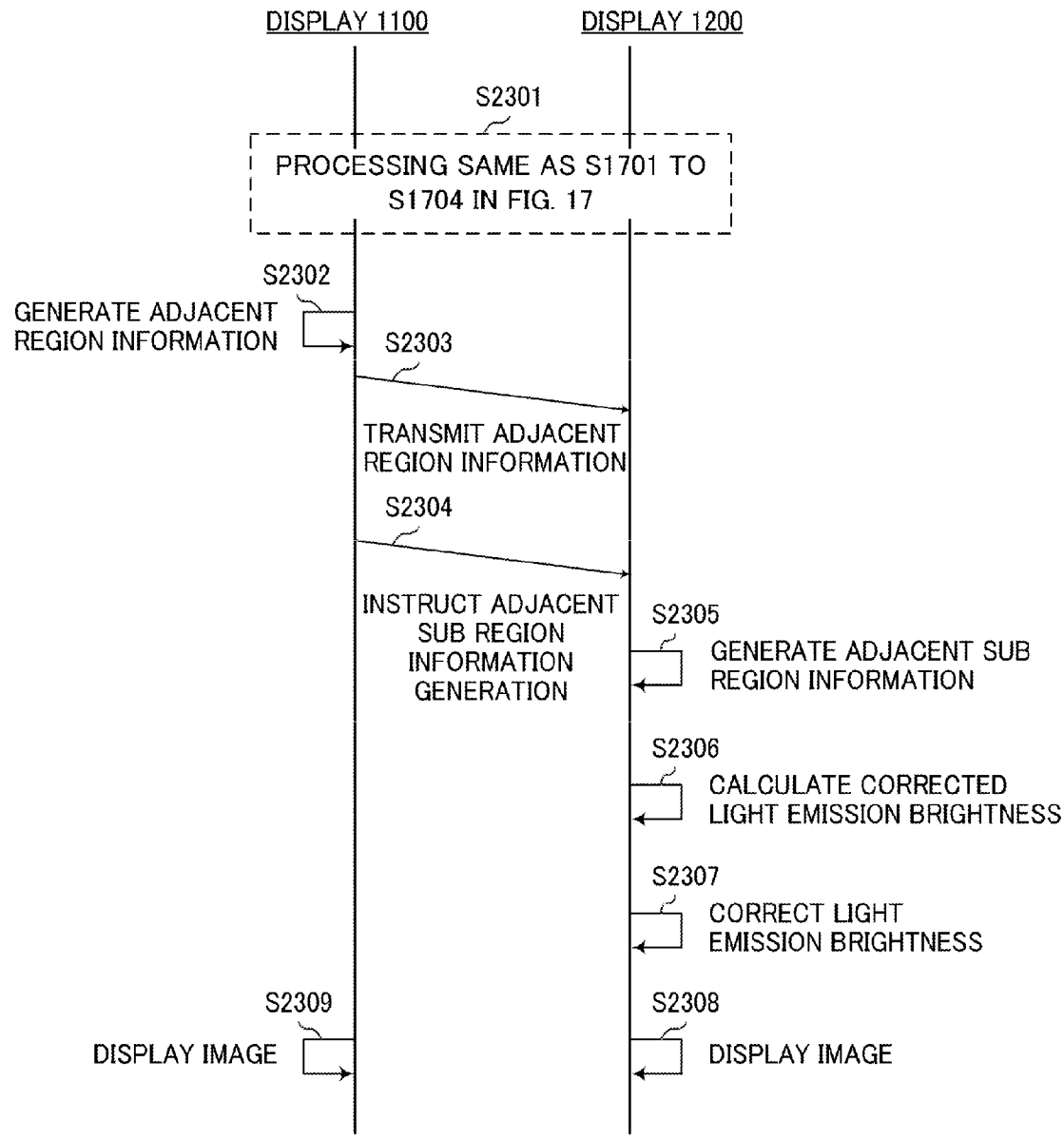
FIG. 22 is an explanatory diagram showing signal processing for the sub control regions in the fifth embodiment.
Figure 23:
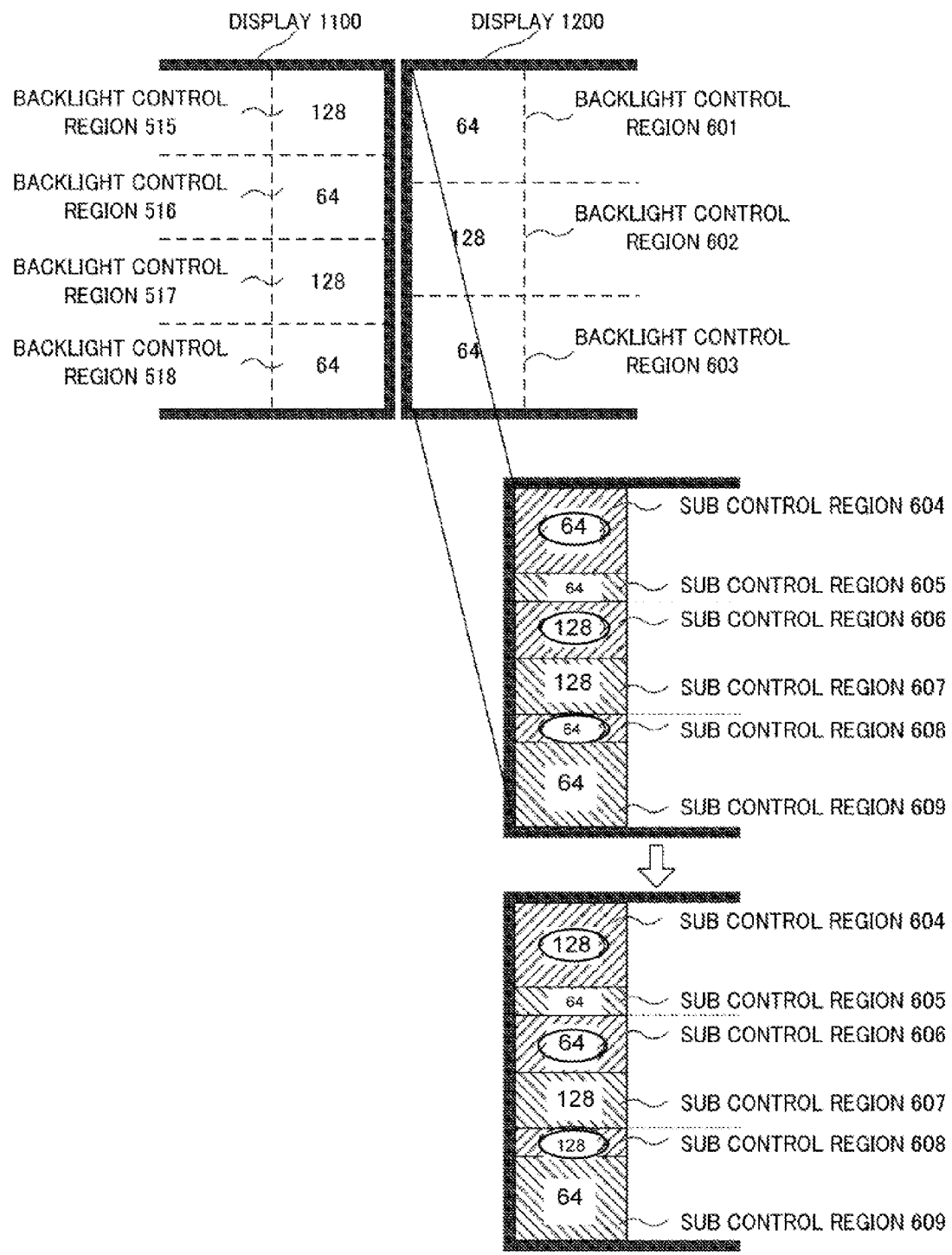
FIG. 23 is an explanatory diagram showing corrected light emission brightness of each of the sub control regions in the fifth embodiment.
Figure 24A:
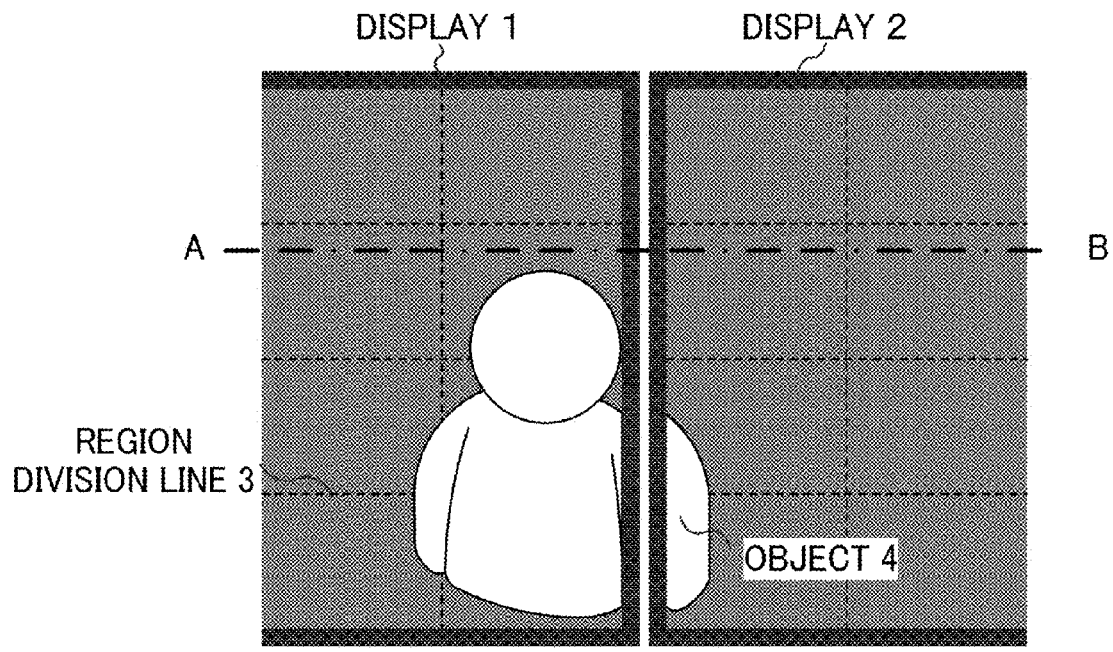
FIGS. 24A to 24D are explanatory diagrams for explaining a problem to be solved by the present invention.
Figure 24B:
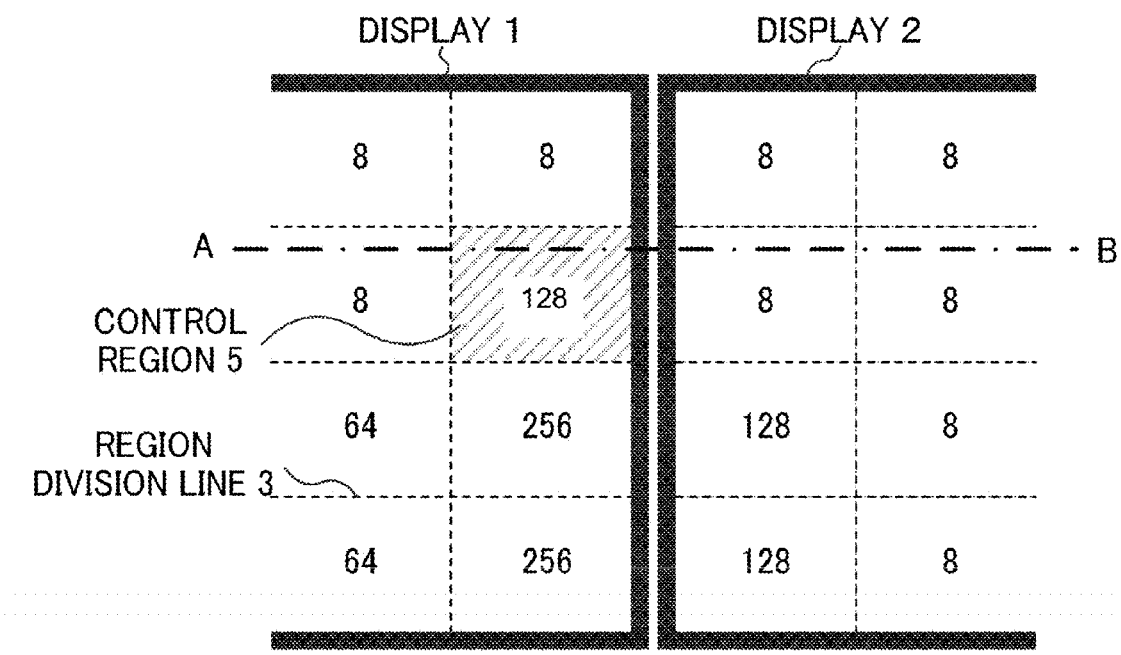
Figure 24C:
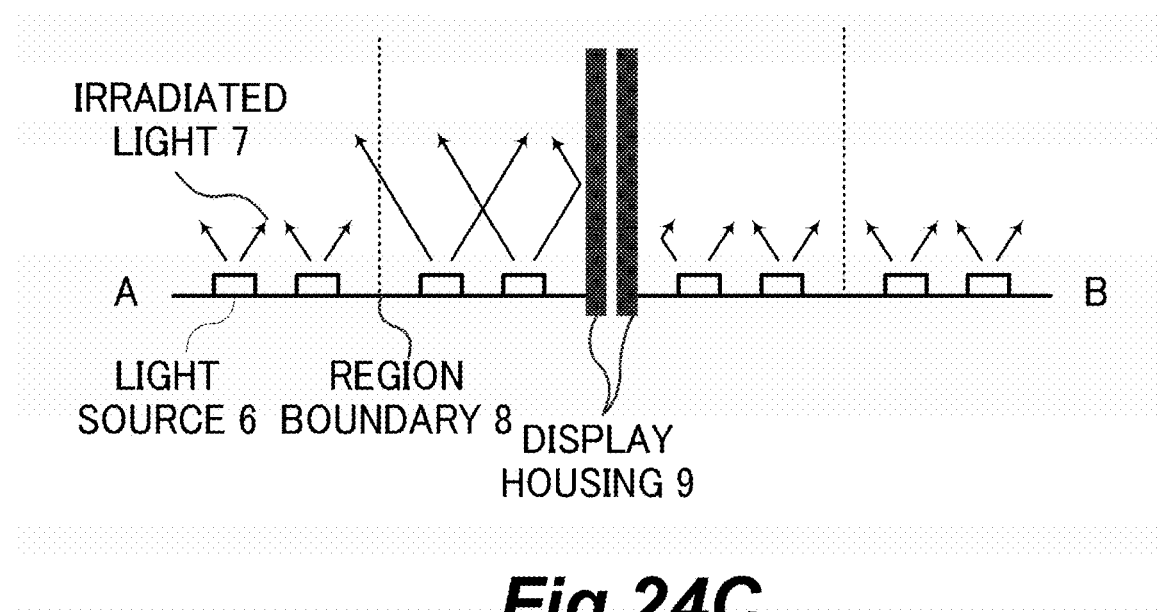
Figure 24D:
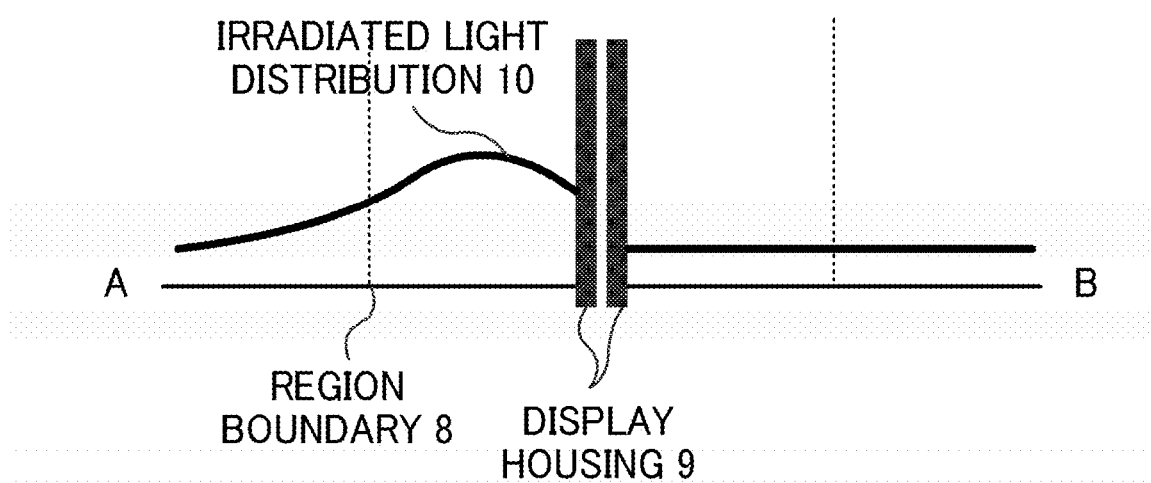

FIG. 22 is a diagram showing a processing flow in which the display 1100 transmits information concerning light emission brightness of the display 1100 to the display 1200 and performs light emission brightness correction to suppress a brightness difference in the boundary between the displays. This processing is executed on image data for each one frame to be output. FIG. 23 is a diagram showing corrected light emission brightness of each of sub control regions determined by the adjacent light emission brightness calculating unit 1115. The light emission brightness correction in the fifth embodiment is explained with reference to FIGS. 22 and 23.

Figure 17:
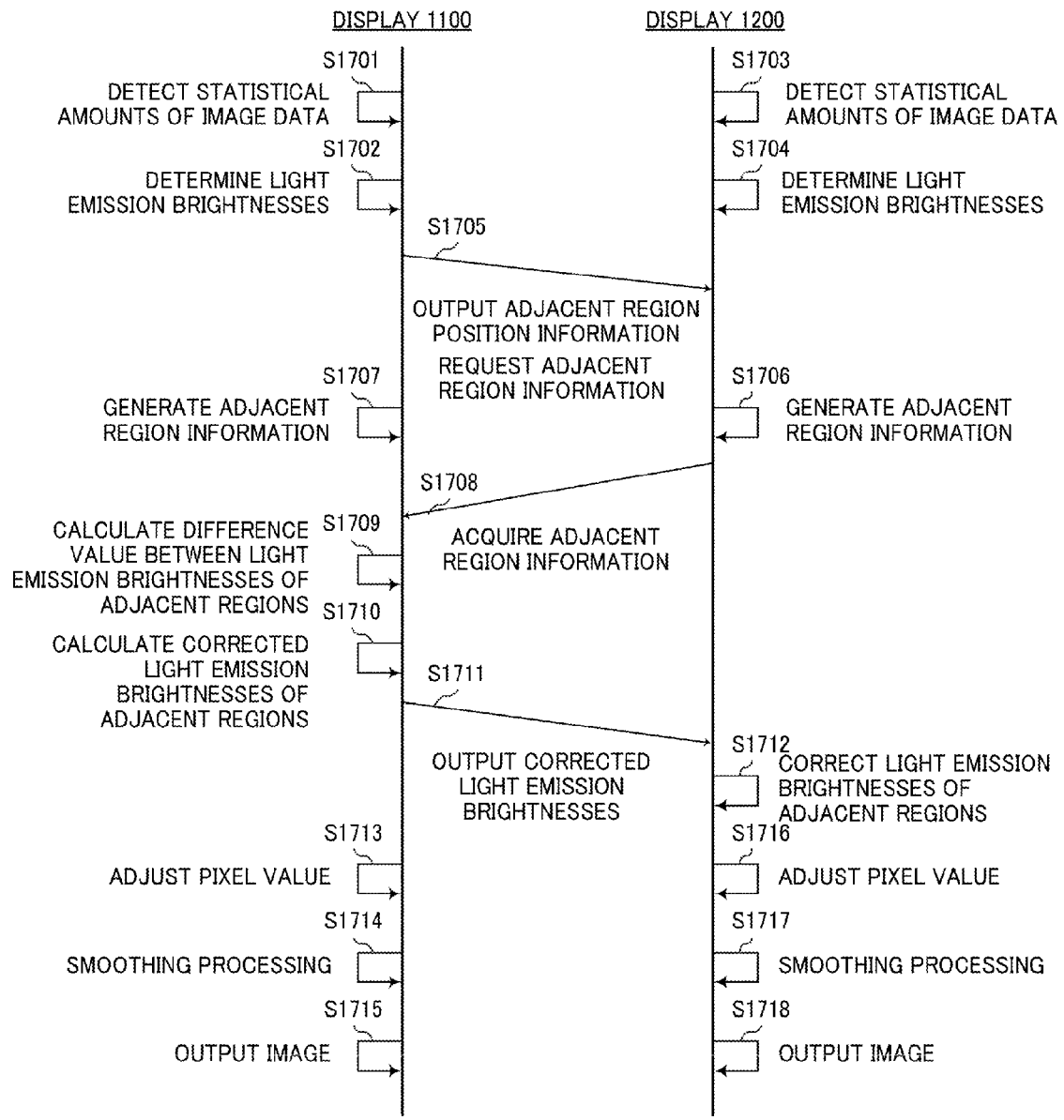
FIG. 17 is a flowchart for explaining processing for setting light emission brightnesses near a display boundary to coincide with each other in the fourth embodiment.

When the sub control regions 604 to 609 are set, first, processing same as S1701 to S1704 of FIG. 17 is performed (S2301). The adjacent region information generating unit 1111 of the display 1100 acquires display information concerning the display 1200 in the configuration of the multi-screen display system from the display information managing unit 1110. Further, the adjacent region information generating unit 1111 generates adjacent region information on the basis of the display information (S2302). The adjacent region information is information in which position information of backlight control regions of the display 1100 (adjacent regions of the display 1100) adjacent to the display 1200 and a value of light emission brightness set for each of the backlight control regions are associated with each other.

The multi-screen control unit 1114 of the display 1100 transmits the adjacent region information of the display 1100 generated in S2302 to the display 1200 via the communication unit 1113 (S2303). The multi-screen control unit 1114 instructs the display 1200 to generate adjacent sub region information of the display 1200 (S2304). The adjacent sub region information of the display 1200 is information in which position information of sub control regions of the display 1200 adjacent to the display 1100 and a value of light emission brightness set for each of the sub control regions are associated with each other. The adjacent region information generating unit of the display 1200 generates adjacent sub region information in the display 1200 according to the instruction from the display 1100 (S2305).

The adjacent light emission brightness calculating unit of the display 1200 specifies a light emission brightness correction target region, which is a region satisfying a light emission brightness correction condition, among the sub control regions. In the fifth embodiment, the adjacent light emission brightness calculating unit specifies the light emission brightness correction target region as explained below. The adjacent light emission brightness calculating unit calculates, for each of regions, a difference value between light emission brightnesses of the sub control regions of the display 1200 and light emission brightnesses of the backlight control regions (the adjacent regions) of the display 1100 adjacent to the sub control regions in the lateral direction. The light emission brightnesses of the sub control regions of the display 1200 are determined on the basis of a characteristic value by the light emission brightness determining unit of the display 1200. The light emission brightnesses of the backlight control regions (the adjacent regions) of the display 1100 are determined on the basis of a characteristic value by the light emission brightness determining unit 1103.

The adjacent light emission brightness calculating unit compares an absolute value of the difference value with a predetermined threshold and determines a region having the absolute value of the difference value larger than the predetermined threshold as a light emission brightness correction target region.

The adjacent light emission brightness calculating unit of the display 1200 determines corrected light emission brightness of each of the sub control regions (S2306). The corrected light emission brightness of each of the sub control regions is determined on the basis of light emission brightness correction target region information, the adjacent sub region information of the display 1200, and the adjacent region information of the display 1100 received from the display 1100. Specifically, the corrected light emission brightness of the light emission brightness correction target region (the sub control region) is determined such that a difference between a value of light emission brightness of the light emission brightness correction target region and a value of light emission brightness of an adjacent region of the display 1100 adjacent to the light emission brightness correction target region in the lateral direction decreases.

Light emission brightness correction processing in the fifth embodiment is more specifically explained with reference to FIG. 23. As shown in FIG. 23, values of light emission brightnesses determined on the basis of a characteristic value by the light emission brightness determining unit 1103 concerning the respective backlight control regions 515 to 518 of the display 1100 are 128, 64, 128, and 64. Values of light emission brightnesses determined on the basis of a characteristic value by the light emission brightness determining unit of the display 1200 concerning the respective backlight control regions 601 to 603 of the display 1200 are 64, 128, and 64.

In this case, in the respective sub control regions 604 to 609 obtained by more finely dividing the backlight control regions 601 to 603, light emission brightnesses of the sub control regions are set to 64, 64, 128, 128, 64, and 64.

The adjacent light emission brightness calculating unit of the display 1200 calculates absolute values of difference values between the light emission brightnesses of the sub control regions and light emission brightnesses of backlight control regions (adjacent regions) of the display 1100 adjacent to the sub control regions in the lateral direction. The adjacent light emission brightness calculating unit specifies a light emission brightness correction target region on the basis of whether the absolute values of the difference values are larger than a predetermined threshold. Processing for specifying the light emission brightness correction target region is specifically explained below.

First, the adjacent light emission brightness calculating unit calculates the absolute values of the difference values. An absolute value of a difference value between the light emission brightness of 64 of the sub control region 604 and the light emission brightness of 128 of the backlight control region 515 is 64. An absolute value of a difference value between the light emission brightness of 64 of the sub control region 605 and the light emission brightness of 64 of the backlight control region 516 is 0. An absolute value of a difference value between the light emission brightness of 128 of the sub control region 606 and the light emission brightness of 64 of the backlight control region 516 is 64. An absolute value of a difference value between the light emission brightness of 128 of the sub control region 607 and the light emission brightness of 128 of the backlight control region 517 is 0. An absolute value of a difference value between the light emission brightness of 64 of the sub control region 608 and the light emission brightness of 128 of the backlight control region 517 is 64. An absolute value of a difference value between the light emission brightness of 64 of the sub control region 609 and the light emission brightness of 64 of the backlight control region 518 is 0. In the fifth embodiment, the predetermined threshold is set to 16. In this case, the sub control regions having the absolute values of the difference values larger than the predetermined threshold are the sub control regions 604, 606, and 608. That is, in the fifth embodiment, the sub control regions 604, 606, and 608 are specified as light emission brightness correction target regions.

The adjacent light emission brightness calculating unit of the display 1200 determines, on the basis of information concerning the specified light emission brightness correction target regions and adjacent region information of the displays, corrected light emission brightnesses of the sub control regions 604, 606, and 608 of the light emission brightness correction targets as shown in FIG. 23. Specifically, in the fifth embodiment, the corrected light emission brightness of the sub control region 604 is set to 128 on the basis of the adjacent region information of the display 1100. Similarly, the corrected light emission brightness of the sub control region 606 is determined as 64 and the corrected light emission brightness of the sub control region 608 is determined as 128.

The adjacent light emission brightness calculating unit of the display 1200 outputs the determined corrected light emission brightnesses to the light emission brightness correcting unit of the display 1200. The light emission brightness correcting unit of the display 1200 overwrites the light emission brightnesses determined by the light emission brightness determining unit of the display 1200 with the input corrected light emission brightnesses (S2307). A backlight unit of the display 1200 configured by a backlight, a control circuit, and an optical unit is controlled on the basis of the corrected light emission brightness. Further, an image based on image data corrected by the image correcting unit of the display 1200 on the basis of the corrected light emission brightness is displayed on the display panel unit of the display 1200 (S2308). At the same time, an image based on input image data is displayed on the display panel unit 1109 configured by a display panel 11091, a driver 11092, and a control board 11093 of the display 1100 (S2309).

According to the processing explained above, it is possible to set the light emission brightnesses close to each other and reduce a brightness difference in the boundary portion between the displays configuring the multi-screen display system and having the local dimming control function and having the division configurations of the backlight control regions different from each other. (In the fifth embodiment, it is possible to eliminate the brightness difference). As a result, in the multi-screen display system, it is possible to suppress discontinuity of brightness in the boundary portion between the displays and perform the multi-screen display at high image quality.

In the fifth embodiment, the corrected light emission brightnesses of the light emission brightness correction target regions of the display 1200 are set to be the same values as the light emission brightnesses of the adjacent regions of the display 1100. However, the corrected light emission brightnesses are not limited to this. If the corrected light emission brightnesses are set such that the light emission brightnesses of the adjacent regions of the display 1100 and the light emission brightnesses of the light emission brightness correction target regions of the display 1200 are close to each other, it is possible to suppress discontinuity of brightness in the boundary portion between the displays. In the example explained in the fifth embodiment, the backlight control regions of the display having the smaller number of divisions are further divided into the sub control regions according to the backlight control regions of the display having the larger number of divisions of the backlight control regions. However, the division of the backlight control regions is not limited to this. For example, the number of divisions of the backlight control regions of the display having the larger number of divisions of the backlight control regions may be reduced to coincide with the size of the backlight control regions of the display having the smaller number of divisions of the backlight control regions. The backlight control regions of both the displays may be divided into the sub control regions.

The preferred embodiments of the present invention are explained above with reference to the drawings. However, the present invention is not limited to the embodiments. For example, the light emission brightness correction may be applied to only one display or the light emission brightness correction may be performed in both the displays to reduce the brightness difference between the displays.

In the embodiments, the threshold of the condition for specifying the light emission brightness correction target regions may be 0. In other words, if there is a brightness difference, even a little, between the adjacent regions of the displays, the light emission brightness correction may be executed. The processing for changing the sizes of the backlight control regions when the sizes of the backlight control regions are different between the adjacent displays explained in the fifth embodiment can also be applied in the configurations in the first to fourth embodiments. The backlight control regions, the sizes of which are changed, may be all the backlight control regions of the display or may be only the backlight control regions adjacent to the boundary portion between the displays.

In the embodiments, the respective plurality of displays configuring the multi-screen display system and the image output apparatus are connected and image data is output from the image output apparatus to the displays. However, the configuration of the multi-screen display system is not limited to this.

For example, the image output apparatus may output image data to only one display among the plurality of displays configuring the multi-screen display system. In this case, the display that receives the image data from the image output apparatus is set as the master display. The image input unit of the master display slices image data of an image region to be displayed on the master display from the image data acquired from the image output apparatus and also slices image data of an image region to be displayed on slave displays. The master display transmits the image data sliced for the slave displays to the slave displays via a communication unit. The master display calculates, on the basis of display arrangement information stored by the display information managing unit, an image region (a coordinate and a size) sliced for the slave displays.

By adopting such a configuration, the image input unit and the display information managing unit in the master display are connected by a signal line. The image input unit acquires, from the display information managing unit, information concerning image regions sliced for the master display and the slave displays and slices image data of image regions to be displayed on the displays. The image input unit and the communication unit of the master display are connected by a signal line. The image data for the slave displays sliced by the image input unit are output from the master display to the slave displays via the communication unit.

The communication unit and the image input unit of the slave display are connected by a signal line. The image input unit of the slave display has a function of converting image data received from the communication unit of the slave display into image data configured by a plurality of frames and outputting the image data. The slave display receives image data of an image region to be displayed by the slave display from the master display via the communication unit and outputs the image data to the image input unit. The image input unit of the slave display applies pixel value adjustment and smoothing processing to the received image data and performs display.

The embodiments can also be applied to a multi-screen display system configured by displays including backlights capable of partially controlling light emission brightness but not having the local dimming control function. For example, when light emission brightnesses of the backlights are different between the displays, the backlight light emission brightness of one display may be corrected to be the same value as the backlight light emission brightness of the other display.

In the present invention, the configuration is illustrated in which the image output apparatus slices, from image data of an image to be displayed in the multi-screen display system, image data of image regions to be displayed on the displays and outputs the image data to the displays. However, the configuration of the present invention is not limited to this. For example, a configuration may be adopted in which the image output apparatus outputs image data of an entire image to be displayed in the multi-screen display system to the displays and the displays slice, from the image data of the entire image, image data of image regions to be displayed on the displays. In the case of this configuration, the display information managing unit only has to include information concerning the image regions to be sliced (coordinates and sizes) as one kind of display information. Further, in the displays, the image input units and the display information managing units are connected by signal lines. The image input units acquire, from the display information managing units, information concerning image regions to be sliced and slice, on the basis of the information, image data of an image to be displayed on the displays.

In the embodiments, the various brightness correcting methods are illustrated in which, when a difference between light emission brightnesses between backlight control regions adjacent to each other across the boundary between the two displays is large, the light emission brightnesses of the adjacent backlight control regions is corrected to reduce the difference between the light emission brightnesses. The embodiments are embodiments in which an execution entity of the brightness correction is varied. In the first to third embodiments, the image output apparatus is the execution entity. In the fourth and fifth embodiments, the display is the execution entity. The present invention can also be applied to a configuration in which a display control apparatus that performs integrated control for causing the plurality of displays to operate as the multi-screen display system is present separately from the image output apparatus and the image output apparatus outputs image data to the display control apparatus. In this case, in the configuration in the first to third embodiments, the display control apparatus that controls the multi-screen display system (a multi-display system) may be set as the execution entity of the brightness correction instead of the image output apparatus. The present invention can be carried out by arbitrarily combining the various brightness correcting methods and the various execution entities illustrated in the embodiments. For example, when the multi-display system is configured by a master/slave system, the master display may execute the brightness correction in the first to third embodiments. The image output apparatus or the display control apparatus may execute the brightness correction in the fourth and fifth embodiments.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-039271, filed on Feb. 28, 2013, and Japanese Patent Application No. 2014-002770, filed on Jan. 9, 2014, which are hereby incorporated by reference herein in their entirety.

What is claimed is:

1. An image display apparatus that configures, together with an other image display apparatus, a multi-screen display system in which one screen is configured by a plurality of image display apparatuses, the image display apparatus comprising:
   a light emitting unit having a plurality of divided regions of which light emission brightness can be individually controlled;
   an acquiring unit configured to acquire information concerning a light emission brightness of each of the plurality of divided regions of the light emitting unit of the image display apparatus, information concerning a light emission brightness of each of a plurality of divided regions, of which light emission brightness can be individually controlled, of a light emitting unit of an other image display apparatus arranged adjacently to the image display apparatus, and information concerning priority levels of the image display apparatus and the other image display apparatus arranged adjacently to the image display apparatus; and
   a correcting unit configured to correct, in a case where a first light emission brightness and a second light emission brightness acquired by the acquiring unit are not substantially equal to each other, among the first light emission brightness and the second light emission brightness, a light emission brightness of a divided region of a light emitting unit of an image display apparatus having a lower priority level such that a difference between the first light emission brightness and the second light emission brightness decreases,
   wherein the first light emission brightness is a light emission brightness of a first divided region of the light emitting unit of the image display apparatus and the second light emission brightness is a light emission brightness of a second divided region, which is one of the plurality of divided regions of the light emitting unit of the other image display apparatus and which is arranged adjacently to the first divided region in a lateral direction.

2. The image display apparatus according to claim 1, further comprising a determining unit configured to determine the light emission brightness of each of the plurality of divided regions of the light emitting unit of the image display apparatus on the basis of the image displayed by the image display apparatus.

3. The image display apparatus according to claim 1, further comprising a transmitting unit configured to transmit information concerning the light emission brightness of each of the plurality of divided regions of the light emitting unit of the image display apparatus including the light emission brightness corrected by the correcting unit to the other image display apparatus.

4. The image display apparatus according to claim 1, wherein the correcting unit performs the correction in a case where a difference between the first light emission brightness and the second light emission brightness is larger than a predetermined threshold.

5. An image output apparatus that outputs an image to a multi-screen display system in which one screen is configured by a plurality of image display apparatuses each including a light emitting unit having a plurality of divided regions of which light emission brightness can be individually controlled, wherein the plurality of image display apparatuses includes a first image display apparatus and a second image display apparatus arranged adjacently to the first image display apparatus, the image output apparatus comprising:
   an acquiring unit configured to acquire information concerning a light emission brightness of each of the plurality of divided regions of the light emitting unit of each of the image display apparatuses and information concerning priority levels of the first image display apparatus and the second image display apparatus;
   a correcting unit configured to correct, in a case where a first light emission brightness and a second light emission brightness acquired by the acquiring unit are not substantially equal to each other, among the first light emission brightness and the second light emission brightness, a light emission brightness of a divided region of a light emitting unit of an image display apparatus having a lower priority level such that a difference between the first light emission brightness and the second light emission brightness decreases, wherein the first light emission brightness is a light emission brightness of a first divided region of a light emitting unit of the first image display apparatus and the second light emission brightness is a light emission brightness of a second divided region, which is one of a plurality of divided regions of a light emitting unit of the second image display apparatus and which is arranged adjacently to the first divided region in a lateral direction; and a transmitting unit configured to transmit, to the plurality of image display apparatuses, information concerning a light emission brightness of each of the plurality of divided regions of the light emitting unit of each of the image display apparatuses, wherein the information includes information concerning the light emission brightness corrected by the correcting unit.

6. The image output apparatus according to claim 5, wherein the correcting unit performs the correction in a case where a difference between the first light emission brightness and the second light emission brightness is larger than a predetermined threshold.

7. A control method for an image display apparatus including a light emitting unit having a plurality of divided regions of which light emission brightness can be individually controlled, the image display apparatus configuring, together with an other image display apparatus, a multi-screen display system in which one screen is configured by a plurality of image display apparatuses, the control method comprising:

acquiring information concerning a light emission brightness of each of the plurality of divided regions of the light emitting unit of the image display apparatus, information concerning a light emission brightness of each of a plurality of divided regions, of which light emission brightness can be individually controlled, of a light emitting unit of an other image display apparatus arranged adjacently to the image display apparatus, and information concerning priority levels of the image display apparatus and the other image display apparatus arranged adjacently to the image display apparatus; and correcting, in a case where a first light emission brightness and a second light emission brightness acquired in the acquiring step are not substantially equal to each other, among the first light emission brightness and the second light emission brightness, a light emission brightness of a divided region of a light emitting unit of an image display apparatus having a lower priority level such that a difference between the first light emission brightness and the second light emission brightness decreases, wherein the first light emission brightness is a light emission brightness of a first divided region of the light emitting unit of the image display apparatus and the second light emission brightness is a light emission brightness of a second divided region, which is one of the plurality of divided regions of the light emitting unit of the other image display apparatus and which is arranged adjacently to the first divided region in a lateral direction.

8. The control method for an image display apparatus according to claim 7, further comprising a step of determining the light emission brightness of each of the plurality of divided regions of the light emitting unit of the image display apparatus on the basis of the image displayed by the image display apparatus.

9. The control method for an image display apparatus according to claim 7, further comprising a step of transmitting information concerning the light emission brightness of each of the plurality of divided regions of the light emitting unit of the image display apparatus including the light emission brightness corrected in the correcting step to the other image display apparatus.

10. The control method for an image display apparatus according to claim 7, wherein in the correcting step, the correction is performed in a case where a difference between the first light emission brightness and the second light emission brightness is larger than a predetermined threshold.

11. A control method for an image output apparatus that outputs an image to a multi-screen display system in which one screen is configured by a plurality of image display apparatuses each including a light emitting unit having a plurality of divided regions of which light emission brightness can be individually controlled, wherein the plurality of image display apparatuses includes a first image display apparatus and a second image display apparatus arranged adjacently to the first image display apparatus, the control method comprising:

acquiring information concerning a light emission brightness of each of the plurality of divided regions of the light emitting unit of each of the image display apparatuses and information concerning priority levels of the first image display apparatus and the second image display apparatus;

correcting, in a case where a first light emission brightness and a second light emission brightness acquired in the acquiring step are not substantially equal to each other, among the first light emission brightness and the second light emission brightness, a light emission brightness of a divided region of a light emitting unit of an image display apparatus having a lower priority level such that a difference between the first light emission brightness and the second light emission brightness decreases, wherein the first light emission brightness is a light emission brightness of a first divided region of a light emitting unit of the first image display apparatus and the second light emission brightness is a light emission brightness of a second divided region, which is one of a plurality of divided regions of a light emitting unit of the second image display apparatus and which is arranged adjacently to the first divided region in a lateral direction; and transmitting, to the plurality of image display apparatuses, information concerning the light emission brightness of each of the plurality of divided regions of the light emitting unit of each of the image display apparatuses, wherein the information includes information concerning the light emission brightness corrected in the correcting step.

12. The control method for an image output apparatus according to claim 11, wherein in the correcting step, the correction is performed in a case where a difference between the first light emission brightness and the second light emission brightness is larger than a predetermined threshold.

* * * * *